US010849327B2

(12) United States Patent
Fukugami et al.

(10) Patent No.: US 10,849,327 B2
(45) Date of Patent: Dec. 1, 2020

(54) APPARATUS FOR ALIGNING AND POSITIONING PIECES OF FOOD DOUGH

(71) Applicant: RHEON AUTOMATIC MACHINERY CO., LTD., Utsunomiya (JP)

(72) Inventors: Taro Fukugami, Utsunomiya (JP); Katsumichi Higuchi, Utsunomiya (JP); Nobuo Oshima, Utsunomiya (JP)

(73) Assignee: RHEON AUTOMATIC MACHINERY CO., LTD., Utsunomiya (JP)

(*) Notice: Subject to any disclaimer, the term of this patent is extended or adjusted under 35 U.S.C. 154(b) by 460 days.

(21) Appl. No.: 15/791,536

(22) Filed: Oct. 24, 2017

(65) Prior Publication Data

US 2018/0116229 A1    May 3, 2018

(30) Foreign Application Priority Data

Oct. 31, 2016  (JP) ................. 2016-213896

(51) Int. Cl.
*A21C 9/08*       (2006.01)
*B65G 47/32*      (2006.01)
*B65G 47/244*     (2006.01)

(52) U.S. Cl.
CPC ............... *A21C 9/08* (2013.01); *A21C 9/085* (2013.01); *B65G 47/244* (2013.01); *B65G 47/32* (2013.01)

(58) Field of Classification Search
CPC ...... B65G 47/244; B65G 37/00; B65G 47/26; B65G 47/28; B65G 47/32; B65G 47/82; B65G 47/902; B65G 47/907; B65G 2203/0225; B65G 2203/0233; B65G 2203/044; B65G 2811/0621; B65G 2811/0626; B65G 2811/0631; A21C 9/085; A21C 11/20; A21C 9/08
USPC ........................................ 198/456, 458, 373
See application file for complete search history.

(56) References Cited

U.S. PATENT DOCUMENTS

| 4,938,339 | A | * | 7/1990 | Benson | ................. | B65G 47/26 |
| | | | | | | 198/458 |
| 5,142,956 | A | * | 9/1992 | Ueno | ...................... | A21C 3/06 |
| | | | | | | 198/379 |
| 6,189,677 | B1 | * | 2/2001 | Ruf | ..................... | B65G 1/0478 |
| | | | | | | 198/411 |

(Continued)

FOREIGN PATENT DOCUMENTS

JP           55-44420        *  9/1978  ............. B65G 47/22

*Primary Examiner* — James R Bidwell
(74) *Attorney, Agent, or Firm* — Sughrue Mion, PLLC

(57) ABSTRACT

The inventions relate to an apparatus for aligning and positioning pieces of food dough with predetermined orientations and at predetermined intervals, and provide an aligning and positioning apparatus that can easily adjust positions of the pieces of food dough in a perpendicular direction to a moving direction of the pieces and that can process at high speed. An aligning and positioning apparatus of the inventions includes a holding unit having a plurality of holding mechanisms to hold a plurality of pieces of food dough carried by a first conveyor, a driving mechanism of the holding mechanisms, guide members to control the positions of the holding mechanisms in the perpendicular direction when the holding mechanisms are moved by the driving mechanism, and a positioning mechanism to adjust positions of the guide members in the perpendicular direction.

19 Claims, 13 Drawing Sheets

(56) References Cited

U.S. PATENT DOCUMENTS

| | | | | |
|---|---|---|---|---|
| 7,191,893 B2* | 3/2007 | Maldina | ............... | B65B 35/32 |
| | | | | 198/418.6 |
| 7,784,599 B2* | 8/2010 | Balleza | ............... | A21C 9/085 |
| | | | | 198/429 |
| 8,033,381 B2* | 10/2011 | Konstandin | ....... | A61F 13/15601 |
| | | | | 198/456 |
| 8,714,078 B2* | 5/2014 | Ueno | .................. | A21C 9/085 |
| | | | | 198/418.7 |
| 9,408,398 B2* | 8/2016 | Kuwabara | ............ | B65G 47/244 |
| 2005/0173225 A1* | 8/2005 | Harwood | ............... | B65G 47/26 |
| | | | | 198/458 |

* cited by examiner

APPARATUS FOR ALIGNING AND POSITIONING PIECES OF FOOD DOUGH

TECHNICAL FIELD

These inventions relate to an apparatus for aligning and positioning a plurality of pieces of food dough ("an aligning and positioning apparatus") to align and position the pieces of food dough, which are cut into a predetermined shape on a conveyor and carried by the conveyor, so as to be positioned with predetermined orientations and at predetermined intervals.

BACKGROUND OF THE INVENTIONS

Various types of apparatuses for aligning pieces of food dough, such as croissant dough, in a predetermined direction have been proposed in the past. An aligning and positioning apparatus disclosed in Patent Document 1 includes a separating apparatus that separates pieces of food dough having a triangular shape in a moving direction of conveyors and translocates the pieces of food dough from an upstream conveyor to a downstream conveyor, and a laying-out and rotating apparatus that lays out the pieces of food dough in the perpendicular direction to the moving direction of the conveyors so as to be positioned at predetermined intervals and rotates the pieces of food dough at predetermined degrees in a predetermined rotational direction.

In this conventional aligning and positioning apparatus, the pieces of food dough are aligned and positioned by separating the pieces of food dough in the moving direction of the conveyors, then laying them out so as to be positioned at the predetermined intervals and rotating them at predetermined degrees in a predetermined rotational direction (Patent Document 1).

In an aligning apparatus disclosed in Patent Document 2, the apparatus aligns pieces of food dough by separating them in the moving direction and rotating them in a predetermined rotational direction, while devices for holding and rotating the pieces of food dough are traveling on an oval-shaped orbit in one direction.

This conventional aligning apparatus can perform at high speed the processes of separating the pieces of food dough in the moving direction and rotating them in the predetermined rotational direction (Patent Document 2).

Patent Document 1: Japanese Patent Laid-open Publication No. 2015-146781
Patent Document 2: European Patent Publication No. EP1192863A2

SUMMARY OF THE INVENTIONS

In the conventional aligning and positioning apparatus disclosed in Patent Document 1, the laying-out and rotating apparatus aligns and positions the pieces of food dough at the predetermined intervals and in a predetermined direction, and a pantograph mechanism can be extended and contracted at an arbitrary length. Thus, Patent Document 1 discloses that the intervals of a plurality of pieces of food dough that are laid out in the perpendicular direction (the cross direction) to the moving direction can be set in arbitrary dimensions. However, since the laying-out and rotating apparatus moves back and forth in the moving direction, there is a problem that it is difficult to produce products at high speed.

In the conventional aligning apparatus disclosed in Patent Document 2, the aligning apparatus can process pieces of food dough at high speed, since the holding and rotating device travels in one direction. However, since this aligning apparatus cannot lay out the pieces of food dough in the perpendicular direction to the moving direction, it is necessary to lay out the pieces of food dough in the perpendicular direction before they are carried to the aligning apparatus. Thus, the aligning apparatus requires a device and space for laying out the pieces of food dough in the perpendicular direction. Further, when the intervals of the pieces of food dough are changed, it is necessary to spend enormous efforts and time.

The present inventions are directed to solve the above problems, and the purpose of the inventions is to provide an aligning and positioning apparatus, which aligns and positions pieces of food dough being cut into a predetermined shape on a conveyor and carried by the conveyor, so as to be positioned with predetermined orientations and at predetermined intervals, that can align and position the pieces of food dough at high speed and further can easily adjust positions of them in the perpendicular direction.

The inventions include the following features:
an apparatus for aligning and positioning a plurality of pieces of food dough, which are arranged in a perpendicular direction to a moving direction of the pieces of food dough, at predetermined intervals,
wherein the apparatus comprising:
a holding unit having a plurality of holding mechanisms to hold a plurality of pieces of food dough arranged in the perpendicular direction;
a driving mechanism to drive the holding units along the moving direction; and
a plurality of guide members to control respective traveling pathways of the holding mechanisms;
wherein the guide members are configured to be disposed in a manner that downstream intervals of the guide members in the perpendicular direction wider or narrower than upstream intervals of the guide members.

The inventions further include the following features:
the driving mechanism comprising:
a pair of endless belts engaged with both ends of the holding units; and
a driving motor to drive the endless belts.

The inventions further include the following features:
the guide member comprising:
a positioning mechanism to change and adjust positions of the guide member in the perpendicular direction.

The inventions further include the following features:
the guide member further comprising:
at least an upstream part, an intermediate part, and a downstream part, which are disposed along the moving direction from an upstream to a downstream;
wherein the upstream part and the downstream part are disposed parallel to the moving direction.

The inventions further include the features:
wherein the positioning mechanism can adjust either position or both of the upstream part and the downstream part of the guide member in the perpendicular direction.

The inventions further include the following features:
the intermediate part of the guide member comprising:
a first guide rail, a second guide rail, and a third guide rail disposed along the moving direction,
wherein the adjacent guide rails are connected by means of an elastic rail.

The inventions further include the features:
wherein a downstream end of the upstream part and an upstream end of the intermediate part of the guide member, and an upstream end of the downstream part and a downstream end of the intermediate part of the guide member, are disposed so as to overlap in space in a vertical direction, respectively.

The inventions further include the features:
wherein the guide members are made of thin plates: and
wherein the holding mechanism comprising two rollers sandwiches the thin plates from both sides.

The inventions further include the following features:
the positioning mechanism comprising:
a pantograph mechanism; and
a driving mechanism for the pantograph mechanism to extend and contract the pantograph mechanism.

The inventions further include the features:
wherein a plurality of holding units are attached on peripheries of the endless belts at regular intervals.

The inventions further include the following features:
the holding mechanism comprising:
a pins-subassembly to hold the piece of food dough;
a rotating member to rotate the pins-subassembly in a horizontal plane; and
a moving member to move the pins-subassembly up and down.

The inventions further include the features:
wherein the rotating member to rotate the pins-subassembly and the moving member to move the pins-subassembly up and down of the holding mechanism are driven separately.

The inventions further include the features:
wherein the rotating member to rotate the pins-subassembly having a rotating mechanism in a counterclockwise direction and the rotating member to rotate the pins-subassembly having a rotating mechanism in a clockwise direction are disposed alternately along the moving direction.

The inventions further include the following features:
the rotating member to rotate the pins-subassembly comprising:
a rotating shaft;
a bearing member to rotatably support the rotating shaft; and
a cylindrical grooved cam slidable along the longitudinal direction of the bearing member,
wherein the rotating shaft has a protruding member on the periphery of the rotating shaft, the cylindrical grooved cam has a spiral groove on the periphery of the cylindrical grooved cam, and the protruding member is slidably inserted in the spiral groove, and
wherein a first slide base engages with the cylindrical grooved cam and moves the cylindrical grooved cam back and forth in the longitudinal direction of the bearing member.

The inventions further include the following features:
the moving member to move the pins-subassembly up and down is slidable in the longitudinal direction of the bearing member,
wherein a plurality of pins are attached to the moving member to move the pins-subassembly up and down, and
wherein a second slide base engages with the moving member to move the pins-subassembly up and down and moves the moving member to move the pins-subassembly up and down back and forth along the longitudinal direction of the rotating shaft.

The inventions further include the following features:
the aligning and positioning apparatus further comprising:
a right-side frame member and a left-side frame member disposed above both sides in a perpendicular direction of conveyors; and
a right-side grooved cam and a left-side grooved cam having a plate-like shape and attached to the inside surfaces of the right-side and left-side frame members faced each other,
wherein the first slide base is engaged with the right-side and left-side grooved cams and configured to be moved along the route of the grooves, which are formed on the right-side and left-side grooved cams for rotating the pins-subassembly.

The inventions further include the following features:
the aligning and positioning apparatus further comprising:
the right-side frame member and the left-side frame member disposed above both sides in the perpendicular direction of the conveyors; and
the right-side grooved cam and the left-side grooved cam having the plate-like shape and attached to the inside surfaces of the right-side and the left-side frame members faced each other,
wherein the second slide base is engaged with the right-side and left-side grooved cams and configured to be moved along the route of the grooves, which are formed on the right-side and left-side grooved cams for moving the pins-subassembly up and down.

Effects of the Inventions

According to the inventions, operations for aligning and positioning the plurality of pieces of food dough, which are cut into a predetermined shape on a conveyor and carried by the conveyor, so as to be positioned with predetermined orientations and at predetermined intervals, can be achieved at high speed.

Further, since it is possible to easily change initial positions for holding the pieces of food dough and locations to be positioned, in the perpendicular direction to the moving direction of the pieces of food dough, when changing types of products, working hours for changing devices and adjusting the devices are reduced, and consequently, productivity is improved.

Further, since the apparatus positions the pieces of food dough at predetermined locations in the perpendicular direction, it is not necessary to preliminarily lay out the pieces of food dough in the perpendicular direction at the upstream of the apparatus, and consequently, simplification and compactification of the apparatus can be achieved.

PREFERRED EMBODIMENTS OF THE INVENTIONS

Below, based on FIGS. 1-9, an apparatus 1 for aligning and positioning pieces of food dough ("an aligning and positioning apparatus 1") of a first embodiment of the inventions is explained.

The aligning and positioning apparatus 1 is an apparatus to align and position pieces of food dough, which are cut out from a sheet of food dough, such as croissant dough, into a nearly triangular shape, with predetermined orientations and at predetermined intervals.

Figure 1:
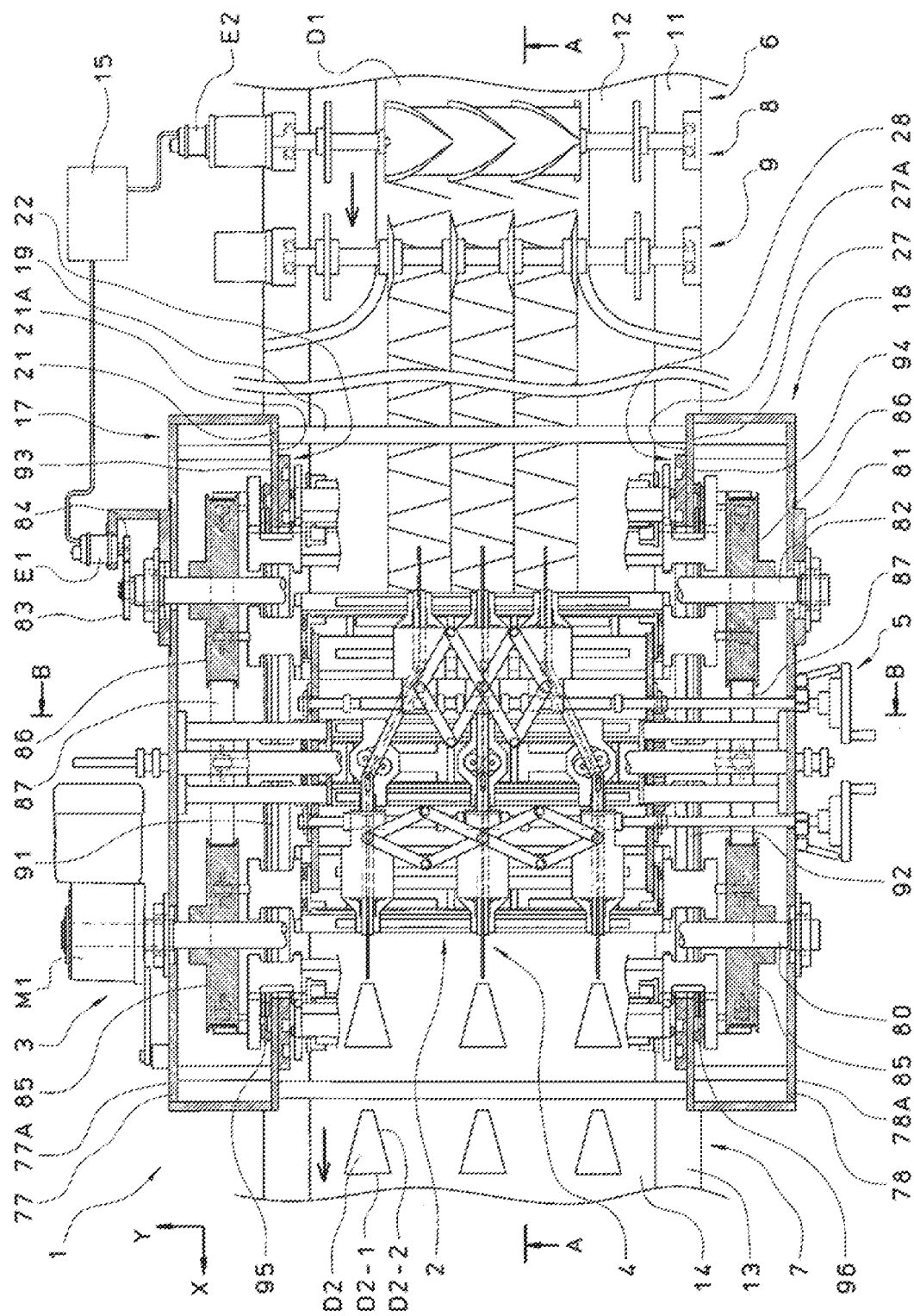
FIG. 1 is a schematic plan view showing a first embodiment of an aligning and positioning apparatus.

For the purpose of convenience, a moving direction of pieces of food dough on conveyors is defined as direction X, and a perpendicular direction to direction X on the conveying surface is defined as direction Y, as shown in FIG. 1.

Figure 2:
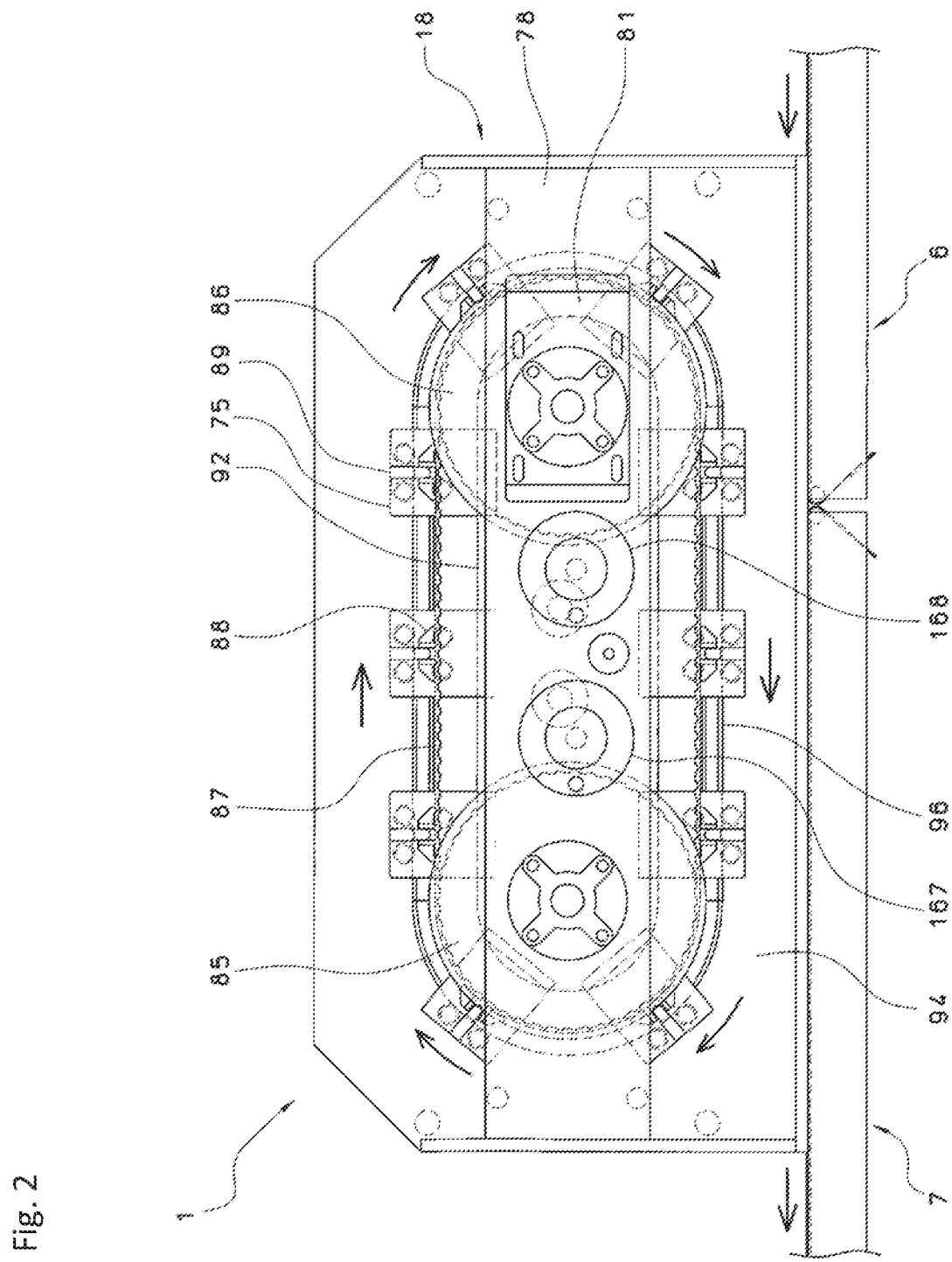
FIG. 2 is a schematic elevational view showing the first embodiment of the aligning and positioning apparatus.

As shown in FIGS. 1 and 2, the aligning and positioning apparatus 1 is disposed above an adjacent position of a first conveyor 6 and a second conveyor 7 adjacently disposed at a downstream of the conveyor 6.

The aligning and positioning apparatus 1 includes:
a holding unit 2 having a plurality of holding mechanisms 35 to hold a plurality of pieces of food dough D2 arranged in direction Y;
a driving mechanism 3 to drive the holding unit 2 along the moving direction;
a plurality of guide members 4; and
a positioning mechanism 5 to variably adjust positions of the guide members 4 in direction Y.

The holding unit 2 is moved around an oval-shaped orbit in one direction by the driving mechanism 3.

In the oval-shaped orbit of the holding unit 2, a straight part of a lower side of the oval-shaped orbit is defined as interval R1, a semicircular part of a downstream as interval R2, a straight part of an upper as interval R3, and a semicircular part of an upstream as interval R4.

The holding unit 2 moves around in direction X in interval R1.

The first conveyor 6 includes a flame 11 and an endless belt 12 driven by a driving motor (not shown in figures). A first device for cutting food dough 8 and a second device for cutting food dough 9 are disposed on the first conveyor 6 in a line from the upstream. The first device for cutting food dough 8 cuts the sheet of food dough at an oblique line D2-2 of a piece of food dough D2, and the second device for cutting food dough 9 cuts the sheet of food dough at a base D2-1 of the piece of food dough D2.

The first device for cutting food dough 8 includes a synchronizing signal generator E2.

The second conveyor 7 includes a flame 13 and an endless belt 14 driven by a driving motor (not shown in figures), and carries the aligned and positioned pieces of food dough D2 toward a downstream.

Further, a velocity V2 of the second conveyor 7 is set faster than a velocity V1 of the first conveyor 6.

Next, the holding unit 2 is explained based on FIGS. 2-7.

In this embodiment, ten units of the holding units 2 are disposed on the oval-shaped orbit at regular intervals. Each holding unit 2 has three holding mechanisms 35 and a frame mechanism 36.

Below, the frame mechanism 36 of the holding units 2 is explained.

The frame mechanism 36 includes a main body 37, a rotating part to rotate a pins-subassembly 38, and a moving part to move the pins-subassembly up and down 39.

The main body 37 of the frame mechanism 36 includes two side plates 47 disposed in parallel to the moving direction X, two brace members 48 bridged in parallel each other between the two side plates 47, and two rails 49 disposed in parallel each other on the two brace members 48. Three sliders 40, 41, and 42 are slidably disposed on each of the two rails 49.

Two rails 61 extending vertically are disposed in parallel each other with an interval on each inner surface of the two side plates 47, which are faced each other. Sliders 62 for the rotating part to rotate the pins-subassembly and sliders 63 for the moving part to move the pins-subassembly up and down are slidably disposed on the rails 61.

One ends of connecting plates 74 are disposed to the upper parts of the side plates 47. The connecting plates 74 extend outwardly from the two side plates 47.

Roller bases 75 are disposed to the other ends of the connecting plates 74 so as to downwardly extend from the connecting plates 74 in parallel to the side plates 47.

Four grooved rollers 76 are rotatably disposed at each surface of the roller bases 75, which faces to the side plates 47, and plates 89 are disposed at the opposite surfaces of the roller bases 75.

The rotating part to rotate the pins-subassembly 38 of the frame mechanism 36 includes side bases 64 bridged between two sliders 62 for the rotating part to rotate the pins-subassembly, two base plates 65 bridged in parallel each other with an interval between the left and right side bases 64, and a plurality of brace members bridged between the two base plates 65.

At inner surfaces of the two base plates 65, two slide bases 66A are disposed, the surfaces of which are facing each other, in a line in the perpendicular direction Y, with a slide base 66B in between. Sectional shapes of the slide bases 66A and the slide base 66B are L-shaped, and the slide bases 66A and the slide base 66B have slide parts 66C and slide part 66D, respectively. The slide bases 66A and the slide base 66B are referred to as a "first slide base."

Pin rods 67 are disposed at the two side bases 64 so as to protrude toward the outside of the side bases 64. The pin rods 67 outwardly extend through holes of the side plates 47. A cam follower 68 is attached to a distal end of each pin rod 67.

The moving part to move the pins-subassembly up and down 39 of the frame mechanism 36 include side bases 69 bridged between the two sliders 63 for the moving part to move the pins-subassembly up and down, two base plates 70 bridged in parallel each other with an interval between the left and right side bases 69, and a plurality of brace members bridged between the two base plates 70.

At inner surfaces of the two base plates 70, two slide bases 71A are disposed, the surfaces of which are facing each other, in a line in the perpendicular direction Y, with a slide base 71B in between. Sectional shapes of the slide bases 71A and the slide base 71B are L-shaped, and the slide bases 71A and the slide base 71B have slide parts 71C and slide part 71D, respectively. The slide bases 71A and the slide base 71B are referred to as a "second slide base."

Pin rods 72 are disposed at the two side bases 69 so as to protrude toward the outside of the side bases 69. The pin rods 72 outwardly extend through holes of the side plates 47. A cam follower 73 is attached to a distal end of each pin rod 72.

Next, the holding mechanism 35 of the holding unit 2 is explained.

The holding mechanism 35 includes a pins-subassembly 55, a rotating member to rotate the pins-subassembly 50, and a moving member to move the pins-subassembly up and down 58.

The rotating member to rotate the pins-subassembly 50 of the holding mechanism 35 includes a bearing member 43, a rotating shaft 44, a plate 45, rolling members 46, protruding members 51, a rotating mechanism in a counterclockwise direction 54 to rotate the pins-subassembly 55 in a counter-clockwise direction, and a rotating mechanism in a clockwise direction 59 to rotate the pins-subassembly 55 in a clockwise direction.

The bearing member 43 has a cylindrical part and is bridged the three sliders 40, 41, and 42 slidably disposed on each of the two rails 49.

The rotating shaft 44 is supported by the cylindrical part of the bearing member 43 through bearings inserted into the upper end and the lower end of the cylindrical part. The plate 45 is supported by the upper end of the rotating shaft 44 through a bearing. The two rolling members 46 are disposed on the upper surface of both side ends of the plate 45 so that the two rolling members 46 have an interval between themselves, wherein the interval corresponds to a thickness of a guide rail of the guide member 4.

The protruding members 51 to rotate the pins-subassembly are disposed on the periphery of the rotating shaft 44 so as to radially protrude from the rotating shaft 44, and the protruding members 51 are located below the lower end of the bearing member 43. The protruding members 51 are disposed at two positions which are symmetric with respect to a point on the center of the rotating shaft 44. It is preferable that the protruding member 51 is rotatable, such as a cam follower, for example.

The rotating mechanism in a counterclockwise direction 54 to rotate the pins-subassembly 55 in the counterclockwise direction has a cylindrical grooved cam 53, and cylindrical grooved cam 53 is disposed on the periphery of the cylindrical part of the bearing member 43 like a concentric ring structure.

Spiral grooves 53-1 are disposed at two positions of the cylindrical grooved cam 53, positions of which are symmetric with respect to a point on the center of the cylindrical part, and the protruding members 51 are slidably inserted into the spiral grooves 53-1.

The spiral groove 53-1 of the cylindrical grooved cam 53 is a right-hand helix, and its helical angle is 90 degrees.

The rotating mechanism in a clockwise direction 59 to rotate the pins subassembly 55 in the clockwise direction has a cylindrical grooved cam 52, and cylindrical grooved cam 52 is disposed on the periphery of the cylindrical part of the bearing member 43 like a concentric ring structure.

Spiral grooves 52-1 are disposed at two positions of the cylindrical grooved cam 52, positions of which are symmetric with respect to a point on the center of the cylindrical part, and the protruding members 51 are slidably inserted into the spiral grooves 52-1.

The spiral groove 52-1 of the cylindrical grooved cam 52 is a left-hand helix, and its helical angle is 90 degrees.

The rotating mechanism in a counterclockwise direction 54 to rotate the pins subassembly 55 in the counterclockwise direction and the rotating mechanism in a clockwise direction 59 to rotate the pins subassembly 55 in the clockwise direction are alternately disposed along the conveying direction X.

A circular groove 52A (53A) is disposed at the upper of the cylindrical grooved cam 52 (53).

Figure 5:
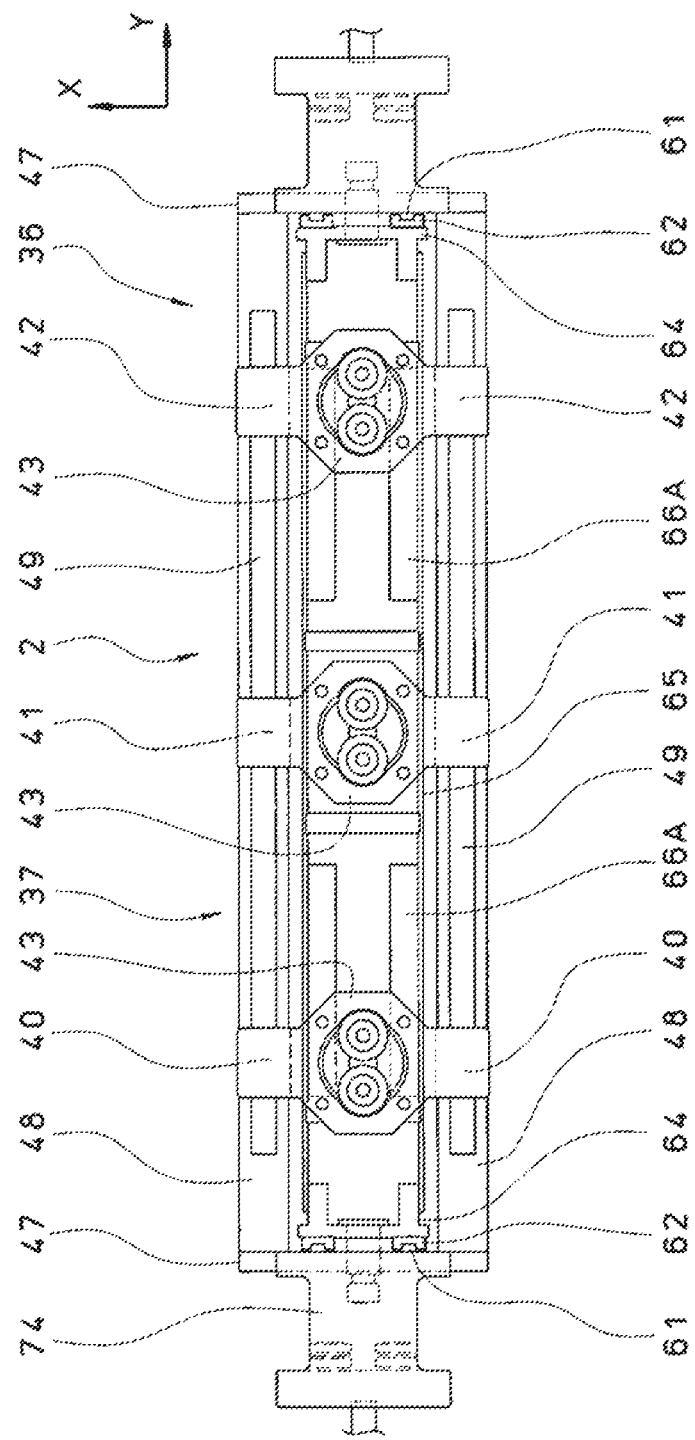
FIG. 5 is a schematic plan view showing a first embodiment of a holding mechanism of the inventions.
Figure 6:
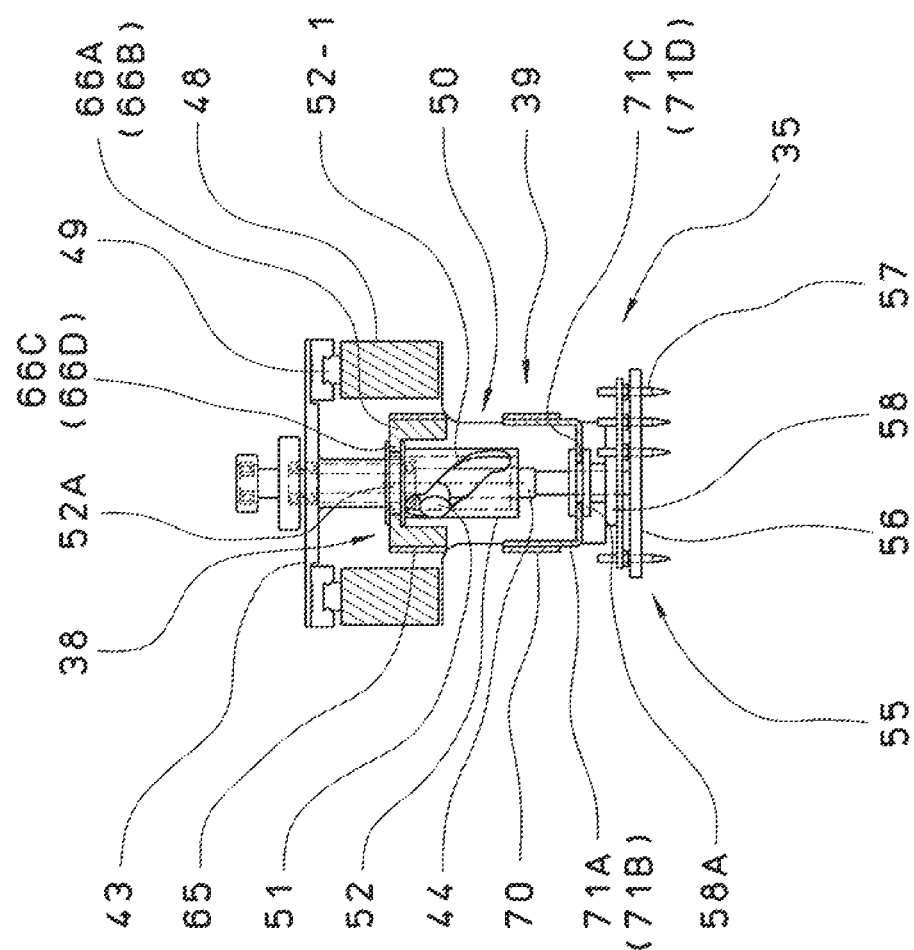
FIG. 6 is a schematic elevational view showing the first embodiment of the holding mechanism of the inventions.
Figure 7:
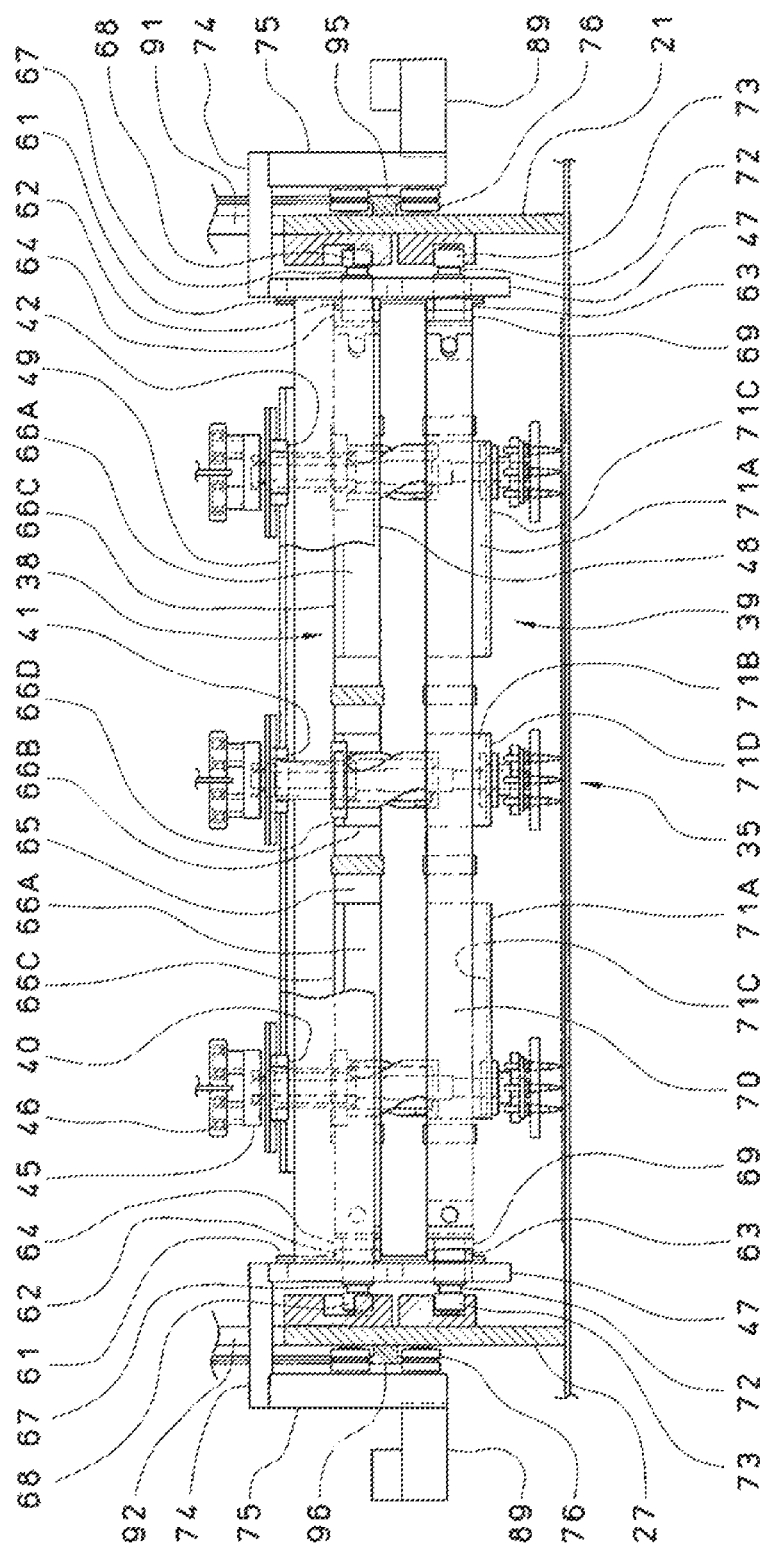
FIG. 7 is a schematic side view showing the first embodiment of the holding mechanism of the inventions.

The circular groove 52A (53A) is slidably engaged with the slide parts 66C of the two slide bases 66A and the slide part 66D of the slide base 66B and can slidably move in the perpendicular direction Y as shown in FIG. 5

In the moving member to move the pins-subassembly up and down 58 of the holding mechanism 35, the rotating shaft 44 is inserted into the center of the cylindrical part of the moving member 58, is slidable in the axial direction of the rotating shaft 44, and is engaged with the cylindrical part of the moving member 58 by using a member, such as a key, to prevent the rotating shaft 44 from rotating relative to the cylindrical part of the moving member 58.

A circular groove 58A is disposed at the upper part of the moving member to move the pins-subassembly up and down 58.

The circular groove 58A is slidably engaged with the slide parts 71C of the two slide bases 71A and the slide part 71D of the slide base 71B and can slidably move in the perpendicular direction Y as shown in FIG. 5.

The pins-subassembly 55 of the holding mechanism 35 includes a pressing plate 56 and pins 57.

The pin 57 is column-shaped, and its distal end is tapered toward the tip. The pins 57 are fixed to the moving member to move the pins-subassembly up and down 58 so that the distal ends of the pins are oriented toward a downward direction.

The pressing plate 56 has a nearly rectangular shape and is fixed to the lower end of the rotating shaft 44. The pressing plate 56 has the same number of through holes, through which the pins 57 are inserted, as that of the pins 57 at the positions corresponding to the positions of the pins 57.

Based on FIGS. 1 and 2, a driving mechanism 3 to drive the holding units 2 along the moving direction is explained.

The driving mechanism 3 includes a right-side frame member 17 and a left-side frame member 18.

The right-side frame member 17 is bridged from the right side toward the downstream of the moving direction X of the flame 11 of the first conveyor 6 to the right side toward the downstream of the moving direction X of the flame 13 of the first conveyor 7.

The left-side frame member 18 is bridged from the left side toward the downstream of the moving direction X of the flame 11 of the first conveyor 6 to the left side toward the downstream of the moving direction X of the flame 13 of the first conveyor 7.

Further, a plurality of brace members 19 are bridged between the right-side frame member 17 and the left-side frame member 18.

The right-side frame member 17 includes an inside plate 21 and an outside plate 77.

The inside plate 21 has an oval hole 91 near its central area, and a right-side grooved cam 22 is disposed on an inner surface 21A of the inside plate 21, wherein the inner surface is faced to the conveyors.

Figure 3:
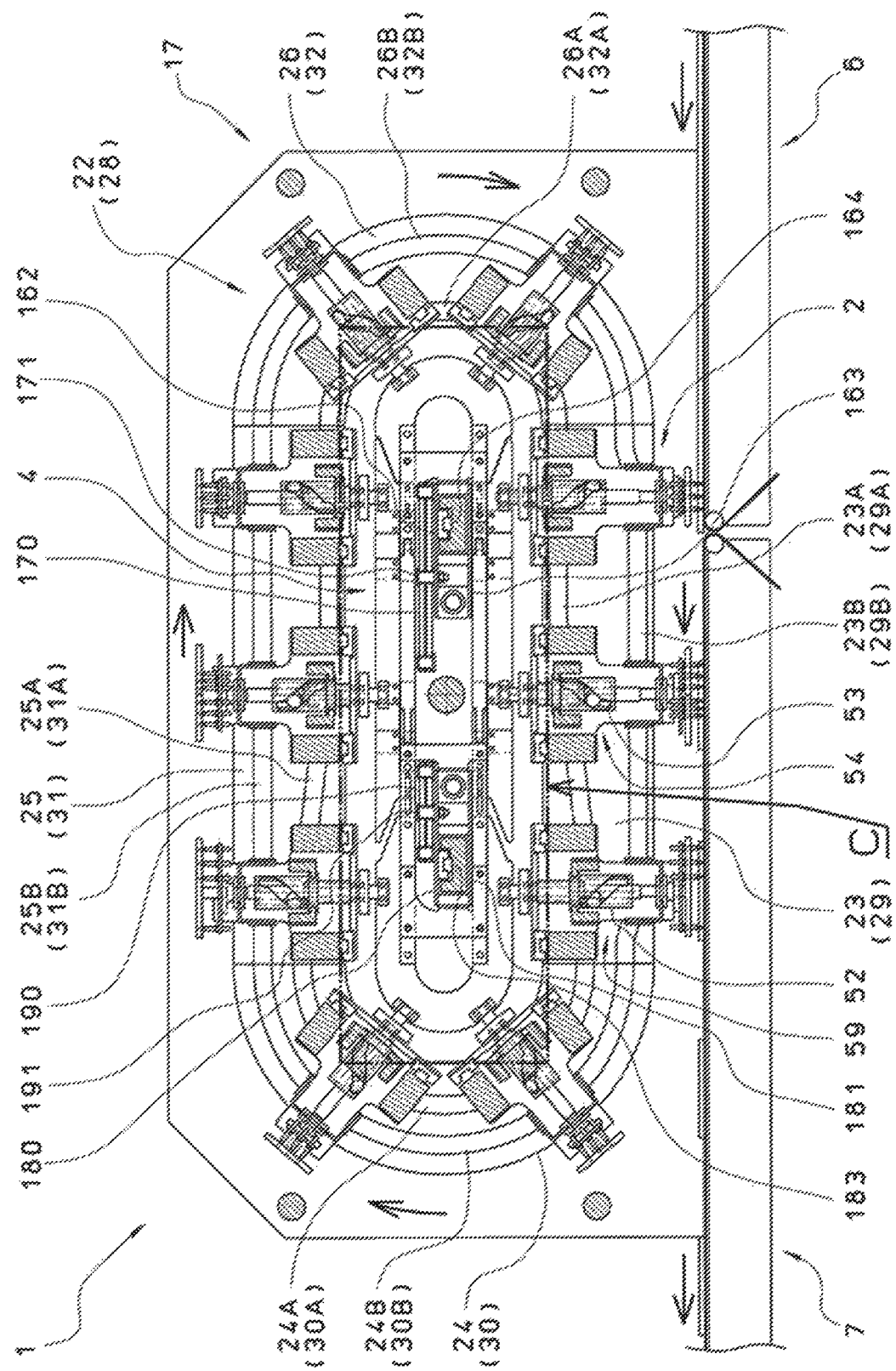
FIG. 3 is a schematic view of cross-section A-A of the aligning and positioning apparatus shown in FIG. 1.
Figure 4:
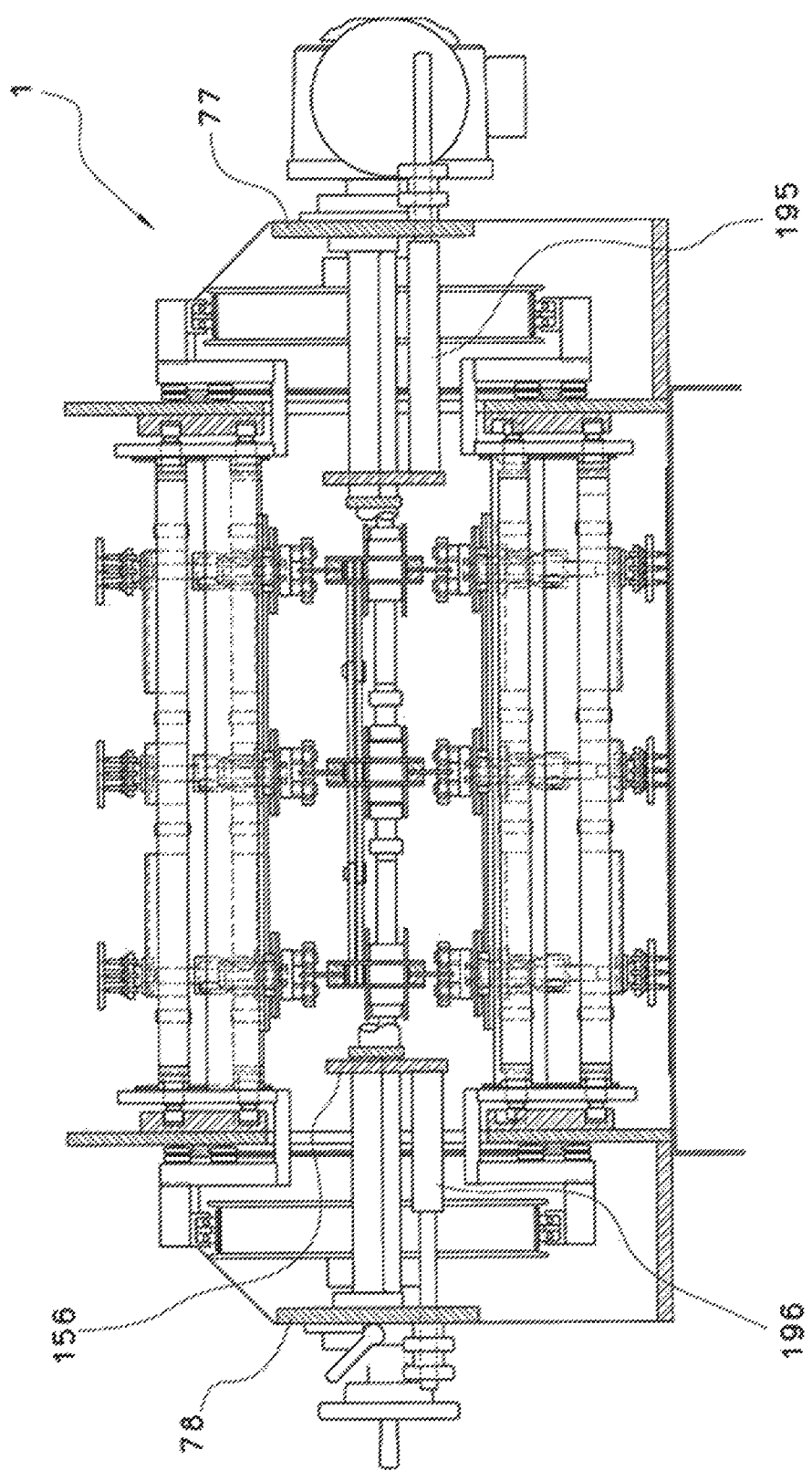
FIG. 4 is a schematic view of cross-section B-B of the aligning and positioning apparatus shown in FIG. 1.

As shown in FIGS. 1 and 3, the right-side grooved cam 22 is divided into four sections, a right-side grooved cam A 23, a right-side grooved cam B 24, a right-side grooved cam C 25, and a right-side grooved cam D 26. The right-side grooved cam 22 includes a cam groove 23A, a cam groove 24A, a cam groove 25A, and a cam groove 26A, which are engaged with the cam follower 68 of the rotating part to rotate the pins-subassembly 38, and a cam groove 23B, a cam groove 24B, a cam groove 25B, and a cam groove 26B, which are engaged with the cam follower 73 of the moving part to move the pins-subassembly up and down 39.

A guide rail for grooved rollers 95 is disposed on an outer surface 93 opposite to the inner surface 21A of the inside plate 21.

The guide rail for the grooved rollers 95 is disposed outside and around the oval hole 91 of the inside plate 21 and has an oval-shaped orbit.

Since the four grooved rollers 76 of the holding unit 2 sandwich the guide rail for the grooved rollers 95, the holding unit 2 revolves along the oval-shaped orbit of the guide rail for the grooved rollers 95.

The left-side frame member 18 includes an inside plate 27 and an outside plate 78.

The inside plate 27 has an oval hole 92 near its central area, and a left-side grooved cam 28 is disposed on an inner surface 27A of the inside plate 27, wherein the inner surface is faced to the conveyors.

As shown in FIGS. 1 and 3, the left-side grooved cam 28 is divided into four sections, a left-side grooved cam A 29, a left-side grooved cam B 30, a left-side grooved cam C 31, and a left-side grooved cam D 32. The left-side grooved cam 28 includes a cam groove 29A, 30A, 31A, and 32A, which are engaged with the cam follower 68 of the rotating part to rotate the pins-subassembly 38, and a cam groove 29B, 30B, 31B, and 32B, which are engaged with the cam follower 73 of the moving part to move the pins-subassembly up and down 39.

A guide rail for grooved rollers 96 is disposed on an outer surface 94 opposite to the inner surface 27A of the inside plate 27.

The guide rail for the grooved rollers 96 is disposed outside and around the oval hole 92 of the inside plate 27 and has an oval-shaped orbit.

Since the four grooved rollers 76 of the holding unit 2 sandwich the guide rail for the grooved rollers 96, the holding unit 2 revolves along the oval-shaped orbit of the guide rail for the grooved rollers 96.

A driving shaft 80 is supported by bearing members disposed on an outer surface 77A of the right-side frame member 17 and an outer surface 78A of the left-side frame member 18. The end of the driving shaft 80 is connected to a driving motor M1, such as a servomotor.

Two driving pulleys 85 are attached to the driving shaft 80 at the inside of the right-side frame member 17 and the left-side frame member 18.

Further, slide plates 81 are disposed at the outer surface 77A of the right-side frame member 17 and the outer surface 78A of the left-side frame member 18, and are slidable in direction X. A driven shaft 82 is supported by the bearing members disposed at the slide plates 81.

A gear 83 is fixed to the end of the driven shaft 82, and engaged with a gear 84 fixed to an end of a shaft of a synchronizing signal generator E1.

Further, two driven pulleys 86 are attached to the driven shaft 82 at the inside of the right-side frame member 17 and the left-side frame member 18.

An endless belt, such as a timing belt, is put around the driving pulleys 85 and the driven pulleys 86.

Fittings 88, whose number corresponds to that of the holding units 2, are attached on the peripheries of the endless belts 87 at regular intervals, and engaged with the plate 89.

It is preferable that the velocities of the endless belts 87 are equal to the moving velocity V2 of the belt 14 of the second conveyor 7. However, the velocities of the endless belts 87 are not limited to that velocity, and are variable according to conditions, such as a state of food dough.

The synchronizing signal generator E1 and the synchronizing signal generator E2 transmit synchronizing signals to a control device 15. The control device 15 receives synchronizing signals, processes them, and controls the timing of the movement of the holding units 2 by controlling the rotation of the driving motor M1.

Figure 8:
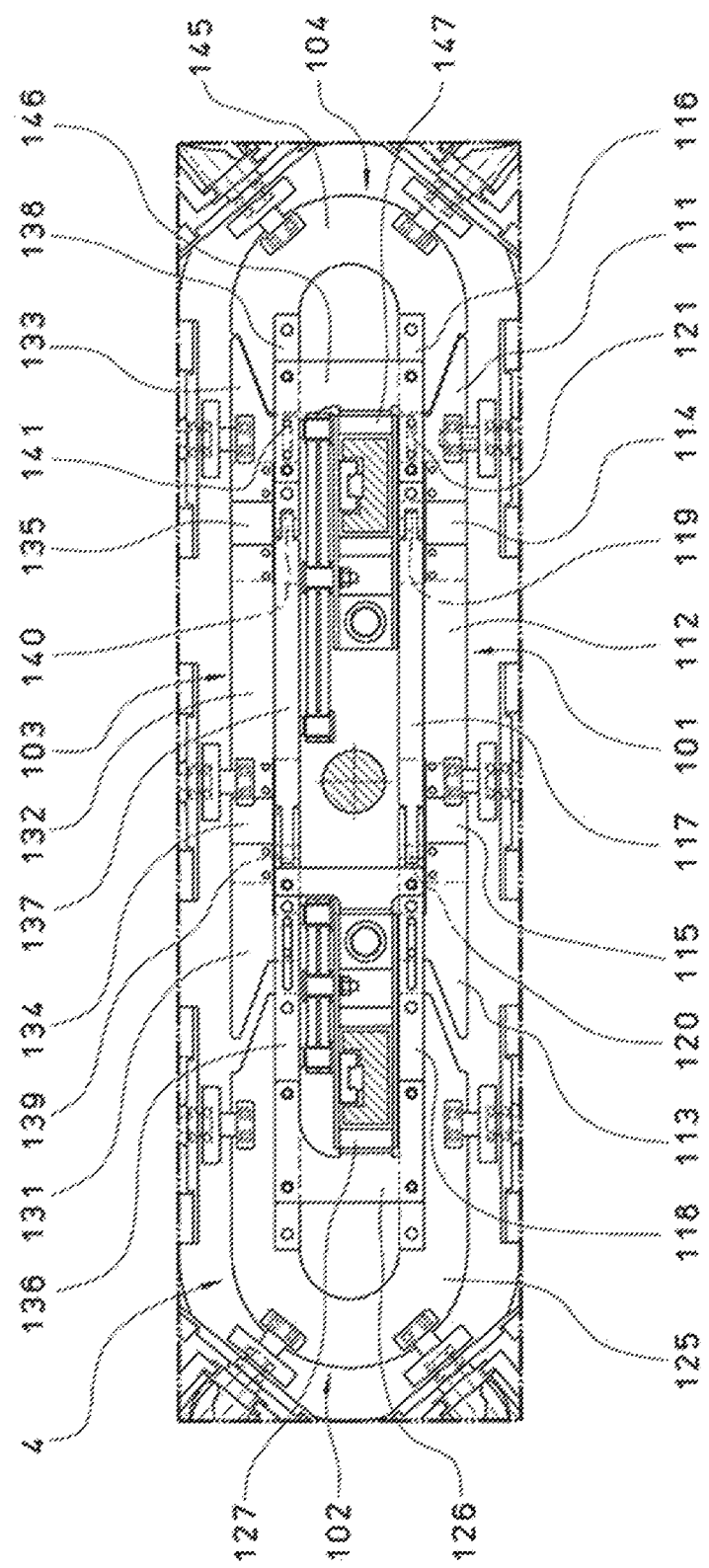
FIG. 8 is a schematic detailed view showing "C" part shown in FIG. 3.

Next, the guide member 4 is explained based on FIG. 8.

The guide member 4 includes an upstream part 104, intermediate parts 101 and 103, and a downstream part 102.

The upstream part 104, the intermediate parts 101 and 103, and the downstream part 102 are guides to determine the locations of the holding mechanisms 35 of the holding unit 2 in the perpendicular direction Y in interval R4, intervals R1 and R3, and interval R2, respectively.

The intermediate part 101 includes a first guide rail 111, a second guide rail 112, a third guide rail 113, and elastic rails 114 and 115.

The first guide rail 111 and the second guide rail 112 are connected by the elastic rail 114 so that their surfaces where the rolling member 46 rolls become flat on the same plane.

Further, the second guide rail 112 and the third guide rail 113 are connected by the elastic rail 115 so that their surfaces where the rolling member 46 rolls become flat on the same plane.

The upper part of the second guide rail 112 is fixed to a rail base 117, and one end of the rail base 117 is rotatably connected to a rail base 116, which is disposed at the upstream of and adjacent to, the rail base 117, by a coupling pin 119, whose axis extends in the vertical direction.

Further, a coupling pin 120, whose axis extends in the vertical direction, is fixed to the other end of the rail base 117, and the rail base 117 is slidably and rotatably connected to a rail base 118 through its slotted hole.

A coupling pin 121 is fixed into the upper part of the first guide rail 111, and is slidably inserted into the slotted hole of the rail base 116.

Further, the coupling pin 121 is fixed into the upper part of the third guide rail 113, and is slidably inserted into the slotted hole of the rail base 118.

The downstream part 102 includes a fourth guide rail 125.

The fourth guide rail 125 is U-shaped and made of a thin plate. At the inside of the both ends of the U-shape, the fourth guide 125 is fixed to the rail base 118 and the rail base 136, together with a bracket 126. The bracket 126 is fixed to a plate 127.

The third guide rail 113 is slidable along the rail base 118, to which the fourth guide rail 125 is fixed, and the third guide rail 113 and the fourth guide rail 125 can move closer to and away from each other.

The shape of the downstream end of the third guide rail 113 of the intermediate part 101 is dovetailed with the shape of the upstream end of the fourth guide rail 125 of the downstream part 102.

The dovetailed part has an oblique line, the downstream end of the third guide rail 113 is located at the lower side, and the upstream end of the fourth guide rail 125 is located at the upper side.

Thus, if the interval between the third guide rail 113 and the fourth guide rail 125 become wider, the peripheral surfaces of the rolling members 46 always contact with either of the guide rails.

In the first embodiment of the inventions, the end of the downstream of the third guide rail 113 and the end of the upstream of the fourth guide rail 125 have the shapes explained above. However, the shapes of the ends of the guide rails are not limited to them. As far as the peripheral surfaces of the rolling members 46 can always contact with either of the guide rails, not only a shape having an oblique line but a shape being concavo-convex or circular may be used.

The intermediate part 103 includes a first guide rail 133, a second guide rail 132, a third guide rail 131, and elastic rails 135 and 134.

The first guide rail 133 and the second guide rail 132 are connected by the elastic rail 135 so that their surfaces where the rolling member 46 rolls become flat on the same plane.

Further, the second guide rail 132 and the third guide rail 131 are connected by the elastic rail 134 so that their surfaces where the rolling member 46 rolls become flat on the same plane.

The lower part of the second guide rail 132 is fixed to a rail base 137, and one end of the rail base 137 is rotatably connected to a rail base 138, which is disposed at the upstream of and adjacent to, the rail base 137, by a coupling pin 140, whose axis extends in the vertical direction.

Further, a coupling pin 139, whose axis extends in the vertical direction, is fixed to the other end of the rail base 137, and the rail base 137 is slidably and rotatably connected to a rail base 136 through its slotted hole.

A coupling pin 141 is fixed into the lower part of the first guide rail 133 and is slidably inserted into the slotted hole of the rail base 138.

Further, the coupling pin 141 is fixed into the lower part of the third guide rail 131 and is slidably inserted into the slotted hole of the rail base 136.

The third guide rail 131 is slidable along the rail base 136, to which the fourth guide rail 125 is fixed, and the third guide rail 131 and the fourth guide rail 125 can move closer to and away from each other.

The shape of the downstream end of the third guide rail 131 of the intermediate part 103 is dovetailed with the shape of the upstream end of the fourth guide rail 125 of the downstream part 102.

The dovetailed part has an oblique line, the downstream end of the third guide rail 131 is located at the upper side, and the upstream end of the fourth guide rail 125 is located at the lower side.

Thus, if the interval between the third guide rail 131 and the fourth guide rail 125 become wider, the peripheral surfaces of the rolling members 46 always contact with either of the guide rails.

In the first embodiment of the inventions, the end of the downstream of the third guide rail 131 and the end of the upstream of the fourth guide rail 125 have the shapes explained above. However, the shapes of the ends of the guide rails are not limited to them. As far as the peripheral surfaces of the rolling members 46 can always contact with either of the guide rails, not only a shape having an oblique line but a shape being concavo-convex or circular may be used.

The upstream part 104 includes a fifth guide rail 145.

The fifth guide rail 145 is U-shaped and made of a thin plate. At the inside of the both ends of the U-shape, the fifth guide 145 is fixed to the rail base 116 and the rail base 138 together with a bracket 146. The bracket 146 is fixed to a plate 147.

The first guide rail 133 is slidable along the rail base 138, to which the fifth guide rail 145 is fixed, and the first guide rail 133 and the fifth guide rail 145 can move closer to and away from each other.

The shape of the upstream end of the first guide rail 133 is dovetailed with the shape of the downstream end of the fifth guide rail 145.

The dovetailed part has an oblique line, the upstream end of the first guide rail 133 is located at the upper side, and the downstream end of the fifth guide rail 145 is located at the lower side.

Thus, if the interval between the first guide rail 133 and the fifth guide rail 145 become wider, the peripheral surfaces of the rolling members 46 always contact with either of the guide rails.

The first guide rail 111 is slidable along the rail base 116, to which the fifth guide rail 145 is fixed, and the first guide rail 111 and the fifth guide rail 145 can move closer to and away from each other.

The shape of the upstream end of the first guide rail 111 is dovetailed with the shape of the downstream end of the fifth guide rail 145.

The dovetailed part has an oblique line, the upstream end of the first guide rail 111 is located at the lower side, and the downstream end of the fifth guide rail 145 is located at the upper side.

Thus, if the interval between the first guide rail 111 and the fifth guide rail 145 become wider, the peripheral surfaces of the rolling members 46 always contact with either of the guide rails.

In the first embodiment of the inventions, the end of the upstream of the first guide rail 133 and the end of the downstream of the fifth guide rail 145, and the end of the upstream of the first guide rail 111 and the end of the downstream of the fifth guide rail 145 have the shapes explained above. However, the shapes of the ends of the guide rails are not limited to them. As far as the peripheral surfaces of the rolling members 46 can always contact with either of the guide rails, not only a shape having an oblique line but a shape being concavo-convex or circular may be used.

Next, based on FIGS. 3, 4, 8, and 9, the positioning mechanism 5 to variably adjust positions of the guide members 4 in direction Y is explained.

The positioning mechanism 5 includes a positioning mechanism for an upstream guide 151 and a positioning mechanism for a downstream guide 152.

The positioning mechanism for the upstream guide 151 includes side plates 156 disposed at both sides of the guide members 4 in direction Y, and brace members 157 are bridged between the two side plates 156.

Positioning shafts 195 and 196 are disposed at the outside of the side plates 156, and are disposed at the opposite sides to each other.

The positioning shafts 195 and 196 pass through the outside plates 77 and 78, and are engaged with fixing nuts at the outer surface of the outside plates 77 and 78. By adjusting the positioning shafts 195 and 196 in direction Y, the center of the guide members 4 in direction Y (in the across-the-width direction) corresponds to the centers of the pieces of food dough D2 in direction Y (in the across-the-width direction), which are conveyed.

The positioning mechanism for the upstream guide 151 adjusts the positions of the first guide rail 111, the first guide rail 133, and the fifth guide rail 145 in direction Y so as to correspond to the positions of the pieces of food dough D2 in direction Y (the intervals among the pieces of food dough D2 in direction Y), which are carried by the first conveyor 6.

An adjusting shaft 158 is supported by bearing members disposed at the side plates 156. The adjusting shaft 158 is inserted in a shaft holder 159, and nut blocks 160 and 161 are engaged with the adjusting shaft 158 at both sides of the shaft holder 159 in the longitudinal direction of the adjusting shaft 158. Screws disposed at the adjusting shaft 158 to engage with the nut blocks 160 and 161 are a right-hand screw and a left-hand screw, and the nut blocks 160 and 161 engaged with those screws have screw holes for the right-hand screw and the left-hand screw.

A handle 168 is disposed at the end of the adjusting shaft 158. By rotating the handle 168, the adjusting shaft 158 rotates, and consequently, the nut blocks 160 and 161 move in direction Y.

An upper base 162 is disposed at the upper side of the shaft holder 159 and the nut blocks 160 and 161, and a lower base 163 is disposed at the lower side of them, so that the upper base 162 and the lower base 163 sandwich them. Further, the plate 147 is sandwiched and fixed between the upper base 162 and the lower base 163.

A rail 164 is disposed on the brace member 157, and sliders 165, 166, and 167 are slidably disposed on the rail 164.

The three sliders 165, 166, and 167 are attached to the lower surface of the upper base 162, which is attached to the shaft holder 159 and the nut blocks 160, 161.

The brace member 157 and the rail 164 are disposed so as to pass through the interval between the upper base 162 and the lower base 163.

The positioning mechanism for the upstream guide 151 includes a pantograph mechanism 170.

Figure 9:
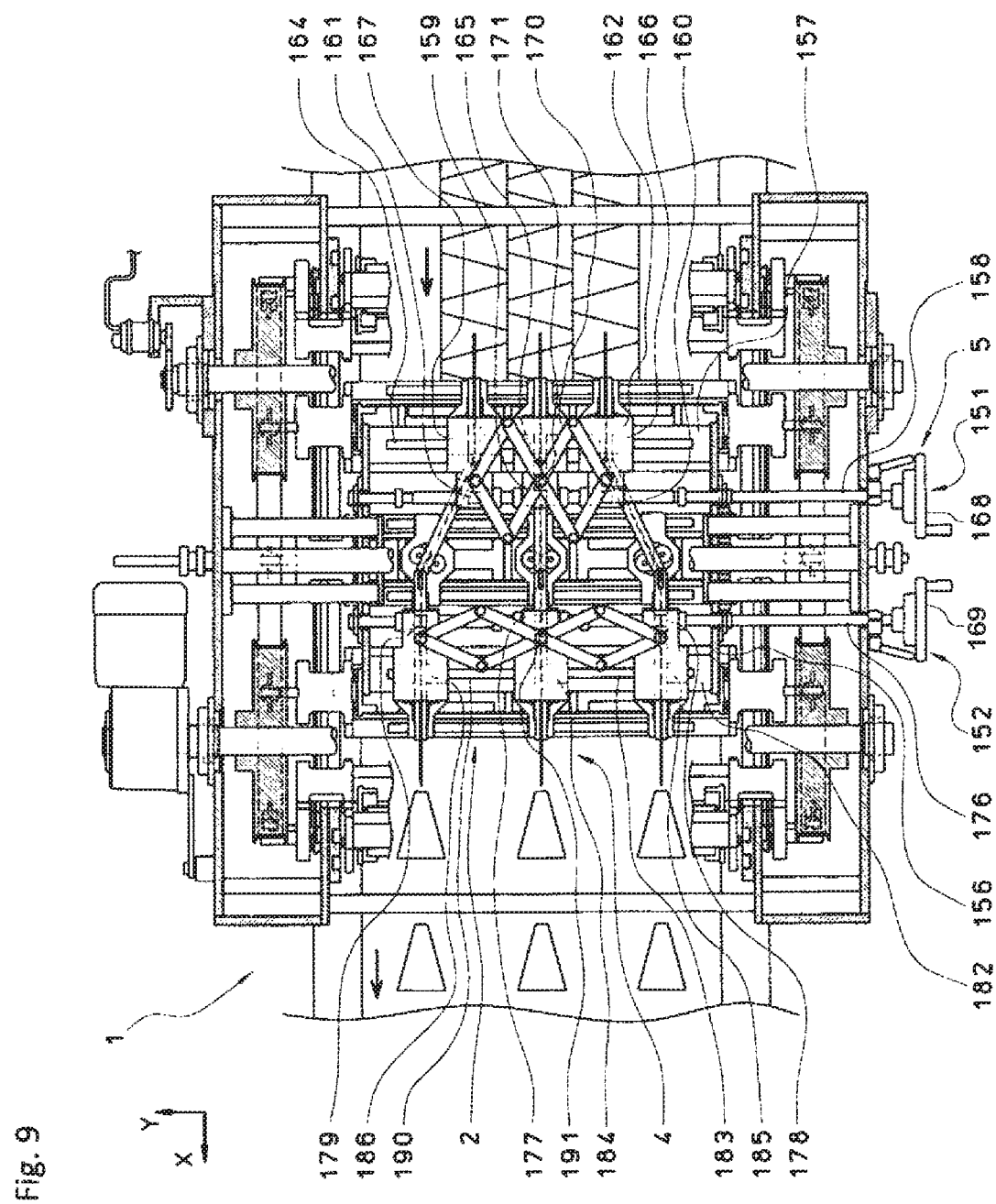
FIG. 9 is a schematic plan view showing the first embodiment of the aligning and positioning apparatus of the inventions.

The pantograph mechanism 170 has such a configuration as shown in FIG. 9, includes links and node points, and is disposed above the upper base 162. In the first embodiment of the inventions, a central column has three node points, and each column of lateral ends has two node points. Node pins 171 disposed above the upper base 162 correspond to the node points of the central column.

The positioning mechanism for the downstream guide 152 includes the side plates 156 disposed at both sides of the guide members 4 in direction Y, and brace members 182 are bridged between the two side plates 156.

The positioning mechanism for the downstream guide 152 adjusts the positions of the third guide rail 113, the third guide rail 131, and the fourth guide rail 125 in direction Y so as to correspond to the positions of the pieces of food dough D2 in direction Y, which are carried by the second conveyor 7.

An adjusting shaft 176 is supported by bearing members disposed at the side plates 156. The adjusting shaft 176 is inserted in a shaft holder 177, and nut blocks 178 and 179 are engaged with the adjusting shaft 176 at both sides of the shaft holder 177 in the longitudinal direction of the adjusting shaft 176. Screws disposed at the adjusting shaft 176 to engage with the nut blocks 178 and 179 are a right-hand screw and a left-hand screw, and the nut blocks 178 and 179 engaged with those screws have screw holes for the right-hand screw and the left-hand screw.

A handle 169 is disposed at the end of the adjusting shaft 176. By rotating the handle 169, the adjusting shaft 176 rotates, and consequently, the nut blocks 178 and 179 move in direction Y.

An upper base 180 is disposed at the upper side of the shaft holder 177 and the nut blocks 178 and 179, and a lower base 181 is disposed at the lower side of them, so that the upper base 180 and the lower base 181 sandwich them. Further, the plate 127 is sandwiched and fixed between the upper base 180 and the lower base 181.

A rail 183 is disposed on the brace member 182, and sliders 184, 185, and 186 are slidably disposed on the rail 183.

The three sliders 184, 185, and 186 are attached to the lower surface of the upper base 180, which is attached to the shaft holder 177 and the nut blocks 178, 179.

The brace member 182 and the rail 183 are disposed so as to pass through the interval between the upper base 180 and the lower base 181.

The positioning mechanism for the downstream guide 152 includes a pantograph mechanism 190.

The pantograph mechanism 190 has such a configuration as shown in FIG. 9, includes links and node points, and is disposed above the upper base 180. In the first embodiment of the inventions, a central column has three node points, and each column of lateral ends has two node points. Node pins 191 disposed above the upper base 180 correspond to the node points of the central column.

Next, the operations of the aligning and positioning apparatus 1 of the first embodiment of the inventions are explained.

The sheet of food dough D1 carried by the first conveyor 6 is cut by the first device for cutting food dough 8 at the parts corresponding to the oblique lines D2-2 of the pieces of food dough D2, and then is cut by the second device for cutting food dough 9 at the parts corresponding to the bases D2-1 of the pieces of food dough D2 along the longitudinal direction of the sheet of food dough D1. Consequently, the sheet of food dough D1 is cut into the pieces of food dough D2 having a nearly triangular shape.

While the pieces of food dough D2 are conveyed toward the downstream in direction X, the pieces of food dough D2 are aligned and positioned so that the positions of the bases D2-1 of the nearly-triangles are changed alternately at 180 degrees, that is, the bases D2-1 change their positions to right, left, right, left, and so on toward the downstream in direction X.

The second conveyor 7 conveys the pieces of food dough D2 toward the downstream in direction X, which are aligned so that all of the bases D2-1 of the nearly-triangles of the pieces of food dough D2 face to the downstream, and are positioned at the predetermined positions in directions X and Y.

The rotating mechanism in the counterclockwise direction 54 to rotate the pins-subassembly 55 in the counterclockwise direction and the rotating mechanism in the clockwise direction 59 to rotate the pins-subassembly 55 in the clockwise direction are alternately disposed along direction X. The rotating mechanism in the counterclockwise direction 54 and the rotating mechanism in the clockwise direction 59 rotate in conformity with the directions of the pieces of food dough D2, which are aligned and positioned so that the positions of the bases D2-1 of the nearly-triangles are changed alternately at 180 degrees, that is, the bases D2-1 change their positions to right, left, right, left, and so on toward the downstream in direction X.

The timing of the movement of the holding unit 2 is controlled by processing signals transmitted by the synchronizing signal generator E1 disposed at the driving mechanism 3 of the holding unit 2 and signals transmitted by the synchronizing signal generator E2 disposed at the first device for cutting food dough 8, and controlling the rotation of the driving motor M1 by means of the control device 15.

By controlling the timing of the movement of the holding unit 2, the directions of the bases D2-1 of the nearly-triangles of the pieces of food dough D2, which are carried by the first conveyor 6, and the initial directions of the holding mechanisms 35 are synchronized.

Simultaneously, the positions of the pieces of food dough D2 and the holding unit 2 in direction X are also synchronized.

In interval R1, before the pieces of food dough D2 are translocated from the first conveyor 6 to the second conveyor 7, the pins-subassemblies 55 and the moving parts to move pins-subassemblies up and down 39 are lowered by the cam followers 73 moving along the cam grooves 23B and 29B of the right-side grooved cam 23 and the left-side grooved cam 29. Then the pieces of food dough D2 are held by sticking the pins into the pieces of food dough D2 from above.

The velocity of the holding unit 2 in direction X is the same velocity as the velocity V2 of the belt of the second conveyor 7. Since the velocity V2 is greater than the velocity V1 (the velocity of the belt of the first conveyor), the held pieces of food dough D2 are separated from the other columns of the pieces of food dough aligned and carried by the first conveyor 6, and translocated to the second conveyor 7.

Since the two rolling members 46 disposed at the holding mechanisms 35 of the holding unit 2 are guided by the guide members 4, the holding mechanism 35 disposed at the center does not move in the right or left directions (in direction Y), and the holding mechanisms 35 disposed at both sides are laid out in the right and left directions, when the pieces of food dough D2 are carried toward the downstream by the holding mechanisms 35.

By the up-and-down motions of the cam followers 68 moving along the cam grooves 23A, 29A of the right-side-grooved cam 23 and the left-side grooved cam 29, the pins-subassemblies 55 are rotated, and consequently, the pieces of food dough D2, which are translocated to the second conveyor 7, are rotated at 90 degrees.

In the first embodiment of the inventions, the rotating mechanism in the counterclockwise direction 54 to rotate the pins-subassembly 55 in the counterclockwise direction and the rotating mechanism in the clockwise direction 59 to rotate the pins-subassembly 55 in the clockwise direction, which are disposed at each of the ten holding units 2, are alternately located along direction X. Thus, the pins-subassemblies 55 are alternately rotated in the clockwise direction, counterclockwise direction, clockwise direction, and so on.

Then, the pins-subassemblies 55 alternately rotate and align the pieces of food dough D2 carried by the first conveyor 6 in the following manner:

the pins-subassemblies 55 rotate the pieces of food dough D2 at 90 degrees in the counterclockwise direction when the bases D2-1 of the pieces of food dough D2 face the right side toward the downstream, and at 90 degrees in the clockwise direction when the bases D2-1 of the pieces of food dough D2 face the left side toward the downstream, and consequently, the pins-subassemblies 55 align them so that all of the bases D2-1 face the downstream.

At that time, before the pins-subassemblies 55 rotate the pieces of food dough D2, it is preferable that the pieces of food dough D2 are laid out in the right and the left directions by the holding mechanisms 35, and apart from each other at a certain interval so as not to interfere with each other.

After the pieces of food dough D2 are laid out at the predetermined positions in direction Y and rotated so that the bases D2-1 face the downstream, the pins-subassemblies 55 are lifted up by the cam followers 73 moving along the cam grooves 23B and 29B of the right-side grooved cam 23 and the left-side grooved cam 29. Then the pins 57 are separated from the pieces of food dough D2.

After the pins 57 are separated from the pieces of food dough D2, and on the way that the holding unit 2 is moved by the driving mechanism 3, the directions of the pins-subassemblies 55 are returned to the initial directions before holding the pieces of food dough D2 by the up-and-down motions of the cam followers 68 moving along the cam grooves 25A and 31A of the right-side grooved cam 25 and the left-side grooved cam 31. Then, the positions of the pins-subassemblies 55 in direction Y returned to the initial positions just before holding the pieces of the food dough D2 by the guide members 4.

Figure 10:
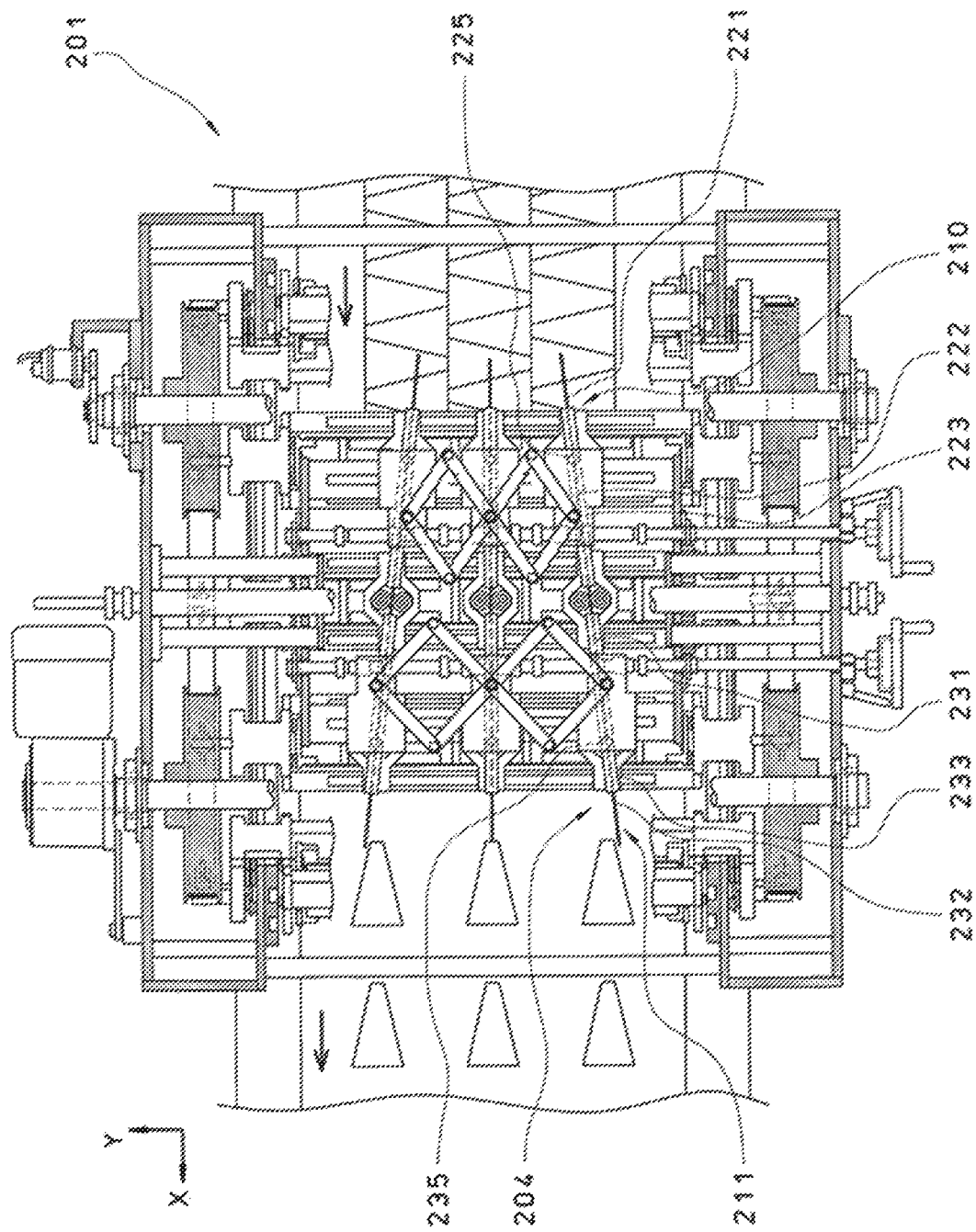
FIG. 10 is a schematic plan view showing a second embodiment of the aligning and positioning apparatus of the inventions.

Next, based on FIG. 10, an aligning and positioning apparatus 201 of a second embodiment of the inventions is explained.

As shown in FIG. 10, the aligning and positioning apparatus 201 is disposed above an adjacent position of the first conveyor 6 and the second conveyor 7 adjacently disposed at a downstream of the conveyor 6.

The aligning and positioning apparatus 201 includes:
 a holding unit 2 having a plurality of holding mechanisms 35 to hold a plurality of pieces of food dough D2 arranged in direction Y;
 a driving mechanism 3 to drive the holding unit 2 along the moving direction;
 a plurality of guide members 204; and
 a positioning mechanism 5 to variably adjust positions of the guide members 204 in direction Y.

In this embodiment, explanations of the same elements as those explained in the first embodiment are omitted.

The guide member 204 is explained based on FIG. 10.

The guide member 204 includes upstream guide members 210 and downstream guide members 211.

The upstream guide members 210 are guides to determine the locations of the holding mechanisms 35 of the holding unit 2 in direction Y at an upstream part in interval R1, at an upstream part in interval R3, and in interval R4. Further, the downstream guide members 211 are guides to determine the locations of the holding mechanisms 35 of the holding unit 2 in direction Y at a downstream part in interval R1, at a downstream part in interval R3, and in interval R2.

The upstream guide member 210 includes a first guide rail 221 and a second guide rail 222.

The first guide rail 221 and the second guide rail 222 are fixed to a rail base 223. The rail base 223 is rotatably attached to the lower base 163 at a support point 225.

The downstream guide member 211 includes a third guide rail 231 and a fourth guide rail 232.

The third guide rail 231 and the fourth guide rail 232 are fixed to a rail base 233. Further, the rail base 233 is rotatably attached to the lower base 163 at a support point 235.

Since the rail base 223 and the rail base 233 are slidably attached, the second guide rail 222 and the third guide rail 231 move closer to and away from each other.

The shape of the downstream end of the second guide rail 222 is dovetailed with the shape of the upstream end of the third guide rail 233.

The dovetailed part has an oblique line, the downstream end of the second guide rail 222 is located at the upper side, and the upstream end of the third guide rail 231 is located at the lower side.

Thus, if the interval between the second guide rail 222 and the third guide rail 231 become wider, the peripheral surfaces of the rolling members 46 always contact with either of the guide rails.

When the positions of the nut blocks 160 and 161 of the positioning mechanism for the upstream guide 151 and the nut blocks 178 and 179 of the positioning mechanism for the downstream guide 152 in direction X are changed by rotating the adjusting shafts 158 and 176 of the positioning mechanism 5 of the guide member, since the second guide rail 222 and the third guide rail 231 move closer to and away from each other, the distance between the support points 225 and 235 can be changed accordingly.

The aligning and positioning apparatuses of the embodiments of the inventions are mostly explained above, however, not limited to those embodiments. Many variations can be applied to the inventions defined in the claims.

In the aligning and positioning apparatuses of the first embodiment, the holding unit 2 has three holding mechanisms 35. However, the holding mechanisms 35 of any number other than three can be applied.

In the aligning and positioning apparatus 1 of the first embodiment, the guide member 4 is divided into four parts. However, the guide member 4 can be divided into parts any number other than three.

Further, in the aligning and positioning apparatuses of the first embodiment, the guide member 4 has the handles 168 and 169. However, a driving source, such as an electric motor, can be used in place of the handles.

In the aligning and positioning apparatus 1 of the first embodiment, the two guide rails of the guide member 4 are connected by the elastic rail. However, the two guide rails can be connected by a hinge mechanism.

Figure 11:
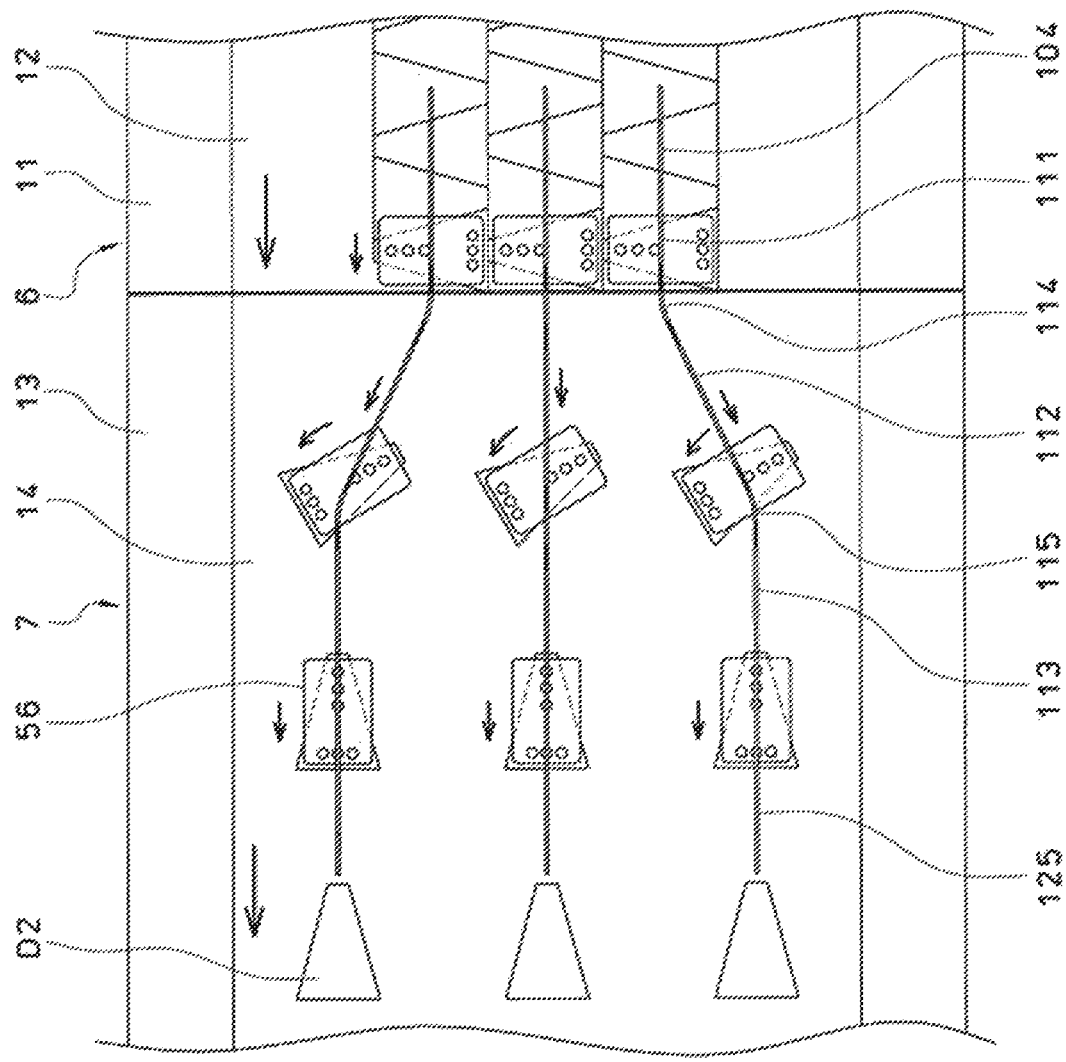
FIG. 11 is a schematic plan view showing operations of the first embodiment of the inventions.
Figure 12:
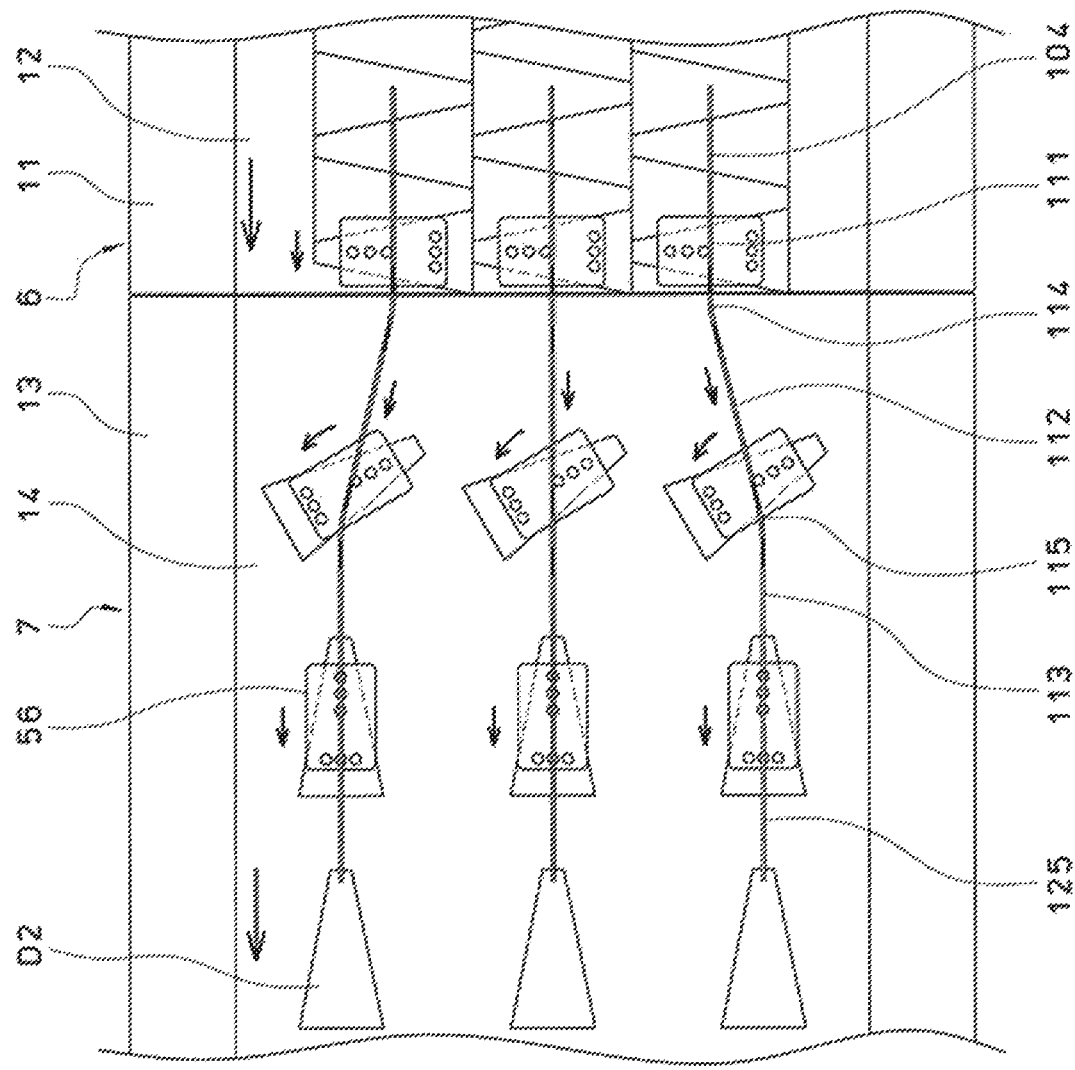
FIG. 12 is a schematic plan view showing operations of the first embodiment of the inventions.
Figure 13:
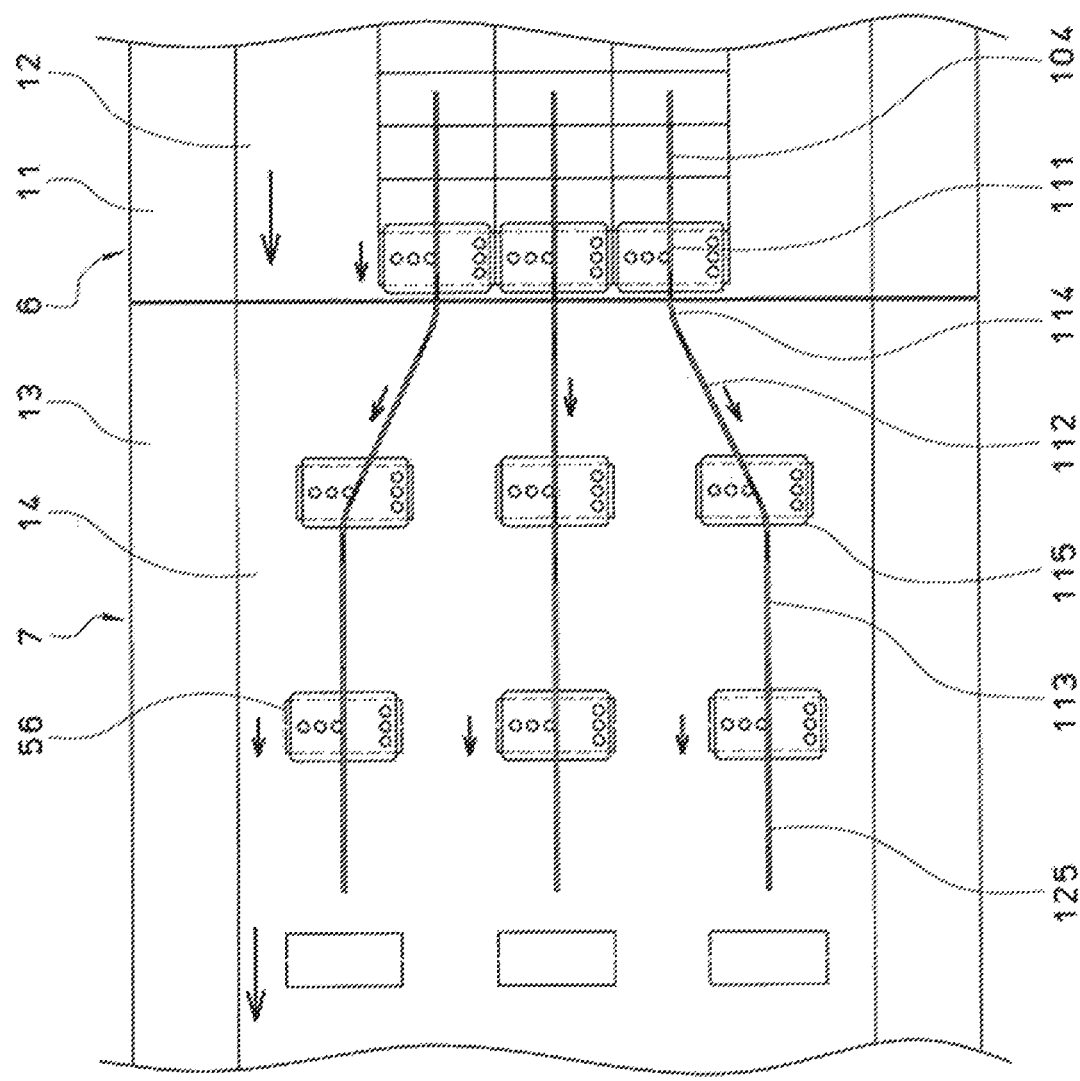
FIG. 13 is a schematic plan view showing operations of a third embodiment of the inventions.

In the aligning and positioning apparatus 1 of the first embodiment, it is explained that the positioning mechanism 5 has both of the positioning mechanism for the upstream guide 151 and the positioning mechanism for the downstream guide 152. However, the positioning mechanism 5 can only have either one of them. For example, as shown in FIGS. 11 and 12, when only the positioning mechanism for the upstream guide is used, the positioning mechanism 5 can deal with the variation of the sizes of the pieces of food dough D2 carried toward the aligning and positioning apparatus 1, and the pieces of food dough D2 can be aligned and positioned at predetermined positions. Further, when only the positioning mechanism for the downstream guide is used, the pieces of food dough D2 can also be aligned and positioned at arbitrary positions.

Further, the width of the downstream of the guide member 4 is greater than that of the upstream. However, the width of the downstream of the guide member 4 can be smaller than that of the upstream.

Further, each of the guide members 4 is disposed so as to correspond to each of the columns in direction X. However, the guide members 4 can be disposed at near the both sides of the conveyor in direction Y. And, the holding unit 2 having a pantograph mechanism can be used.

In the above explanations, the holding mechanisms 35 revolve on the oval-shaped orbit in one direction. However, the positioning mechanism 5 of the guide members can be used in a mechanism, in which the holding mechanisms 35 move back and forth along direction X.

In the above explanations, the holding mechanisms 35 revolve on the oval-shaped orbit in one direction. However, the holding mechanisms 35 can revolve on a circular orbit.

In the aligning and positioning apparatus 1 of the first embodiment, the pieces of food dough D2 are rotated at 90 degrees. However, the angle of the rotation is not limited to 90 degrees, and other angle of the rotation, such as 45 degrees, can be used. Further, without rotating the pieces of food dough D2, the apparatus can be an apparatus for only laying out them in direction X and Y.

EXPLANATIONS OF DENOTATIONS 1 an apparatus for aligning and positioning pieces of food dough (an aligning and positioning apparatus)
2 a holding unit
3 a driving mechanism (for a holding unit)
4 a guide member
5 a positioning mechanism (for a guide member in direction Y)
22 a right-side grooved cam
28 a left-side grooved cam
35 a holding mechanism
50 a rotating member to rotate a pins-subassembly
52, 53 a cylindrical grooved cam
55 a pins-subassembly
58 a moving member to move a pins-subassembly up and down
101 an intermediate part
102 a downstream part
103 an intermediate part
104 an upstream part
151 a positioning mechanism for an upstream guide
152 a positioning mechanism for a downstream guide
170, 190 a pantograph mechanism
D1 a sheet of food dough
D2 pieces of food dough
D2-1 a base of a piece of food dough
X a moving direction
Y a perpendicular direction to the moving direction in a moving plane

What we claim is:

1. An apparatus for aligning and positioning a plurality of pieces of food dough, which are arranged in a perpendicular direction to a moving direction of the pieces of food dough, at predetermined intervals, the apparatus comprising:
    a holding unit having a plurality of holding mechanisms to hold a plurality of pieces of food dough arranged in the perpendicular direction;
    a driving mechanism to drive the holding units along the moving direction; and
    a plurality of guide members to control respective traveling pathways of the holding mechanisms;
    wherein each holding mechanism of the holding unit is respectively guided by a different guide member of the plurality of guide members,
    wherein the guide members are configured to be disposed in a manner that downstream intervals of the guide members in the perpendicular direction are wider or narrower than upstream intervals of the guide members; and wherein the driving mechanism comprising:
a pair of endless belts engaged with both ends of the holding units; and
a driving motor to drive the endless belts.

2. The apparatus for aligning and positioning a plurality of pieces of food dough according to claim 1, wherein the guide member comprising:
a positioning mechanism to change and adjust positions of the guide member in the perpendicular direction.

3. The apparatus for aligning and positioning a plurality of pieces of food dough according to claim 1, wherein the guide member further comprising:
at least an upstream part, an intermediate part, and a downstream part, which are disposed along the moving direction from an upstream to a downstream, wherein the upstream part and the downstream part are disposed parallel to the moving direction.

4. The apparatus for aligning and positioning a plurality of pieces of food dough according to claim 3, wherein the intermediate part of the guide member comprising:
a first guide rail, a second guide rail, and a third guide rail disposed along the moving direction, wherein the adjacent guide rails are connected by means of an elastic rail.

5. The apparatus for aligning and positioning a plurality of pieces of food dough according to claim 1, wherein a plurality of holding units are attached on peripheries of the endless belts at regular intervals.

6. An apparatus for aligning and positioning a plurality of pieces of food dough, which are arranged in a perpendicular direction to a moving direction of the pieces of food dough, at predetermined intervals, the apparatus comprising:
a holding unit having a plurality of holding mechanisms to hold a plurality of pieces of food dough arranged in the perpendicular direction;
a driving mechanism to drive the holding units along the moving direction; and
a plurality of guide members to control respective traveling pathways of the holding mechanisms;
wherein each holding mechanism of the holding unit is respectively guided by a different guide member of the plurality of guide members,
wherein the guide members are configured to be disposed in a manner that downstream intervals of the guide members in the perpendicular direction are wider or narrower than upstream intervals of the guide members;
wherein the guide members are made of thin plates, and
wherein the holding mechanism comprising two rollers which sandwich the thin plates from both sides.

7. The apparatus for aligning and positioning a plurality of pieces of food dough according to claim 6, wherein the guide member comprising:
a positioning mechanism to change and adjust positions of the guide member in the perpendicular direction.

8. The apparatus for aligning and positioning a plurality of pieces of food dough according to claim 6, wherein the guide member further comprising:
at least an upstream part, an intermediate part, and a downstream part, which are disposed along the moving direction from an upstream to a downstream, wherein the upstream part and the downstream part are disposed parallel to the moving direction.

9. The apparatus for aligning and positioning a plurality of pieces of food dough according to claim 8, wherein the intermediate part of the guide member comprising:
a first guide rail, a second guide rail, and a third guide rail disposed along the moving direction, wherein the adjacent guide rails are connected by means of an elastic rail.

10. An apparatus for aligning and positioning a plurality of pieces of food dough, which are arranged in a perpendicular direction to a moving direction of the pieces of food dough, at predetermined intervals, the apparatus comprising:
a holding unit having a plurality of holding mechanisms to hold a plurality of pieces of food dough arranged in the perpendicular direction;
a driving mechanism to drive the holding units along the moving direction; and
a plurality of guide members to control respective traveling pathways of the holding mechanisms;
wherein each holding mechanism of the holding unit is respectively guided by a different guide member of the plurality of guide members,
wherein the guide members are configured to be disposed in a manner that downstream intervals of the guide members in the perpendicular direction are wider or narrower than upstream intervals of the guide members; and
wherein the holding mechanism comprising:
a pins-subassembly to hold the piece of food dough,
a rotating member to rotate the pins-subassembly in a horizontal plane; and
a moving member to move the pins-subassembly up and down.

11. The apparatus for aligning and positioning a plurality of pieces of food dough according to claim 10, wherein the guide member comprising:
a positioning mechanism to change and adjust positions of the guide member in the perpendicular direction.

12. The apparatus for aligning and positioning a plurality of pieces of food dough according to claim 10, wherein the rotating member to rotate the pins-subassembly and the moving member to move the pins-subassembly up and down of the holding mechanism are driven separately.

13. The apparatus for aligning and positioning a plurality of pieces of food dough according to claim 10, wherein the rotating member to rotate the pins-subassembly having a rotating mechanism in a counterclockwise direction and the rotating member to rotate the pins-subassembly having a rotating mechanism in a clockwise direction are disposed alternately along the moving direction.

14. The apparatus for aligning and positioning a plurality of pieces of food dough according to claim 10, wherein the rotating member to rotate the pins-subassembly comprising:
a rotating shaft;
a bearing member to rotatably support the rotating shaft; and
a cylindrical grooved cam slidable along the longitudinal direction of the bearing member,
wherein the rotating shaft has a protruding member on the periphery of the rotating shaft, the cylindrical grooved cam has a spiral groove on the periphery of the cylindrical grooved cam, and the protruding member is slidably inserted in the spiral groove, and
wherein a first slide base engages with the cylindrical grooved cam and moves the cylindrical grooved cam back and forth in the longitudinal direction of the bearing member.

15. The apparatus for aligning and positioning a plurality of pieces of food dough according to claim 10, wherein the moving member to move the pins-subassembly up and down is slidable in the longitudinal direction of the bearing member, wherein a plurality of pins are attached to the moving member to move the pins-subassembly up and down, and wherein a second slide base engages with the moving member to move the pins-subassembly up and down and moves the moving member to move the pins-subassembly up and down back and forth along the longitudinal direction of the rotating shaft.

16. The apparatus for aligning and positioning a plurality of pieces of food dough according to claim 14, wherein the aligning and positioning apparatus further comprising:
  a right-side frame member and a left-side frame member disposed above both sides in a perpendicular direction of conveyors; and
  a right-side grooved cam and a left-side grooved cam having a plate-like shape and attached to the inside surfaces of the right-side and left-side frame members faced each other, wherein the first slide base is engaged with the right-side and left-side grooved cams and configured to be moved along the route of the grooves, which are formed on the right-side and left-side grooved cams for rotating the pins-subassembly.

17. The apparatus for aligning and positioning a plurality of pieces of food dough according to claim 15, wherein the aligning and positioning apparatus further comprising:
  the right-side frame member and the left-side frame member disposed above both sides in the perpendicular direction of the conveyors; and
  the right-side grooved cam and the left-side grooved cam having the plate-like shape and attached to the inside surfaces of the right-side and the left-side frame members faced each other, wherein the second slide base is engaged with the right-side and left-side grooved cams and configured to be moved along the route of the grooves, which are formed on the right-side and left-side grooved cams for moving the pins-subassembly up and down.

18. The apparatus for aligning and positioning a plurality of pieces of food dough according to claim 10, wherein the guide member further comprising:
  at least an upstream part, an intermediate part, and a downstream part, which are disposed along the moving direction from an upstream to a downstream, wherein the upstream part and the downstream part are disposed parallel to the moving direction.

19. The apparatus for aligning and positioning a plurality of pieces of food dough according to claim 18, wherein the intermediate part of the guide member comprising:
  a first guide rail, a second guide rail, and a third guide rail disposed along the moving direction, wherein the adjacent guide rails are connected by means of an elastic rail.

* * * * *